United States Patent
Na et al.

(10) Patent No.: US 11,624,028 B2
(45) Date of Patent: *Apr. 11, 2023

(54) METHOD OF SUPPRESSING DUST GENERATION, SOIL STABILIZING COMPOSITION, AND SPRAY DEVICE INCLUDING SOIL STABILIZING COMPOSITION

(71) Applicant: CJ CHEILJEDANG CORPORATION, Seoul (KR)

(72) Inventors: Kyung Su Na, Suwon-si (KR); Eun Hye Lee, Suwon-si (KR); Young Lyeol Yang, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/253,595

(22) PCT Filed: Aug. 30, 2019

(86) PCT No.: PCT/KR2019/011181
§ 371 (c)(1),
(2) Date: Dec. 17, 2020

(87) PCT Pub. No.: WO2020/046059
PCT Pub. Date: Mar. 5, 2020

(65) Prior Publication Data
US 2021/0269717 A1 Sep. 2, 2021

(30) Foreign Application Priority Data
Aug. 31, 2018 (KR) .................. 10-2018-0104009
Aug. 27, 2019 (KR) .................. 10-2019-0105271

(51) Int. Cl.
*C09K 3/22* (2006.01)
*C09K 17/14* (2006.01)

(52) U.S. Cl.
CPC ................ *C09K 17/14* (2013.01); *C09K 3/22* (2013.01)

(58) Field of Classification Search
CPC . C09K 3/00; C09K 3/22; C09K 17/00; C09K 17/14; C09K 17/32; C07C 59/265; C07C 229/26
See application file for complete search history.

(56) References Cited

U.S. PATENT DOCUMENTS

| 4,959,412 A | 9/1990 | Arter et al. |
| 5,026,821 A | 6/1991 | Boustta et al. |

(Continued)

FOREIGN PATENT DOCUMENTS

| CA | 1278132 C | 12/1990 |
| CN | 1210551 A | 3/1999 |

(Continued)

OTHER PUBLICATIONS

English Abstract of JP 2002-020749.
(Continued)

*Primary Examiner* — Matthew R Diaz
(74) *Attorney, Agent, or Firm* — Cantor Colburn LLP

(57) ABSTRACT

Provided are a method of suppressing dust generation, a soil stabilizer composition including a salt of lysine and citric acid; and a solvent, and a spraying device including the same. The method of suppressing dust generation, the method comprising: preparing a soil stabilizer composition comprising a salt of lysine and citric acid; and a solvent; and spraying the soil stabilizer composition on soil.

12 Claims, 1 Drawing Sheet

(56) References Cited

U.S. PATENT DOCUMENTS

| | | | |
|---|---|---|---|
| 5,284,891 A | 2/1994 | Wouters et al. | |
| 5,932,473 A | 8/1999 | Swiderek et al. | |
| 6,166,102 A | 12/2000 | Ahn et al. | |
| 6,395,198 B1* | 5/2002 | McArdle | C09K 3/22 252/384 |
| 6,486,285 B2 | 11/2002 | Fujita | |
| 6,777,465 B2 | 8/2004 | Haile | |
| 6,881,008 B1* | 4/2005 | Maile | C09K 17/48 252/88.1 |
| 7,021,864 B2* | 4/2006 | Maile | C09K 17/40 252/88.1 |
| 7,306,844 B2 | 12/2007 | Chu et al. | |
| 7,398,935 B2 | 7/2008 | Tran et al. | |
| 7,939,145 B2 | 5/2011 | Dronzek, Jr. | |
| 8,519,031 B2 | 8/2013 | Parker et al. | |
| 9,238,761 B2 | 1/2016 | Omura | |
| 9,959,985 B2 | 5/2018 | Ichinomiya et al. | |
| 2003/0064178 A1 | 4/2003 | Smith et al. | |
| 2003/0099760 A1* | 5/2003 | Okai | A23L 27/21 426/650 |
| 2003/0166726 A1 | 9/2003 | Bechtel et al. | |
| 2006/0019234 A1* | 1/2006 | Shanbrom | A61K 35/19 435/2 |
| 2007/0128339 A1* | 6/2007 | Mankovitz | A23L 33/175 426/656 |
| 2008/0015386 A1* | 1/2008 | Murata | C07C 229/26 562/561 |
| 2013/0316231 A1 | 11/2013 | Iijima et al. | |
| 2014/0186351 A1 | 7/2014 | Britta et al. | |
| 2014/0323573 A1* | 10/2014 | Zander | A61K 31/131 514/554 |
| 2016/0108138 A1 | 4/2016 | Hardy et al. | |
| 2020/0017729 A1* | 1/2020 | Hwang | C09J 11/06 |
| 2020/0017730 A1 | 1/2020 | Hwang et al. | |
| 2021/0269717 A1 | 9/2021 | Na et al. | |

FOREIGN PATENT DOCUMENTS

| | | | |
|---|---|---|---|
| CN | 001334714 A | 2/2002 | |
| CN | 101475790 A | 7/2009 | |
| CN | 101602947 A | 12/2009 | |
| CN | 102190589 A | 9/2011 | |
| CN | 102329582 B | 1/2012 | |
| CN | 103599080 A | 2/2014 | |
| CN | 104379139 A | 2/2015 | |
| CN | 104583333 B | 4/2015 | |
| CN | 106661450 A | 5/2017 | |
| CN | 106906053 A | 6/2017 | |
| CN | 108966655 A | 12/2018 | |
| EP | 0196844 B1 | 9/1992 | |
| EP | 1310174 A1 | 5/2003 | |
| EP | 1988922 | 11/2008 | |
| EP | 1849486 B1 | 4/2015 | |
| EP | 3152276 A1 | 4/2017 | |
| EP | 3299400 B1 | 6/2019 | |
| EP | 3604470 A1 | 2/2020 | |
| FR | 1458094 | 12/1964 | |
| FR | 1458094 A * | 10/1966 | |
| FR | 2648044 A1 | 12/1990 | |
| IT | 1177563 B * | 8/1987 | |
| JP | 2002020749 A | 1/2002 | |
| JP | 2002138161 A | 5/2002 | |
| JP | 2003160693 A | 6/2003 | |
| JP | 2004002092 A | 1/2004 | |
| JP | 2007161642 A | 6/2007 | |
| JP | 2009022179 A | 2/2009 | |
| JP | 2011099099 A | 5/2011 | |
| JP | 4796493 B2 | 8/2011 | |
| JP | 2014074092 A | 4/2014 | |
| JP | 2014105331 A | 6/2014 | |
| JP | 2015117347 A | 6/2015 | |
| JP | 5959867 B2 | 8/2016 | |
| KR | 1020030018443 B1 | 6/2003 | |
| KR | 100401453 B1 | 10/2003 | |
| KR | 1020070104446 A | 10/2007 | |
| KR | 100989942 A | 10/2010 | |
| KR | 1020100118953 A | 11/2010 | |
| KR | 1020100137146 A | 12/2010 | |
| KR | 1020130046842 A | 5/2013 | |
| KR | 1020130086919 B1 | 5/2013 | |
| KR | 101427207 B1 | 8/2014 | |
| KR | 1020160095132 A | 8/2016 | |
| KR | 1020180107010 A | 10/2018 | |
| RU | 2110549 C1 | 5/1998 | |
| RU | 2558365 C2 | 3/2010 | |
| RU | 0002440396 C2 | 1/2012 | |
| RU | 2015155299 A | 5/2014 | |
| WO | 1997019141 A1 | 5/1997 | |
| WO | 2006001345 A1 | 1/2006 | |
| WO | WO-2006001345 A1 * | 1/2006 | C07C 229/26 |
| WO | 2006012615 A2 | 2/2006 | |
| WO | 2007092772 A2 | 8/2007 | |
| WO | 2007120653 A1 | 10/2007 | |
| WO | 2010071298 A2 | 6/2010 | |
| WO | 2011136568 A2 | 11/2011 | |
| WO | 2015086545 A1 | 6/2015 | |
| WO | 2015177114 A1 | 11/2015 | |
| WO | 2015184490 A1 | 12/2015 | |
| WO | WO-2018174570 A1 * | 9/2018 | A61K 8/365 |
| WO | 2020046059 A2 | 3/2020 | |

OTHER PUBLICATIONS

English Abstract of JP 2009-022179.
English Abstract of KR 10-2010-0118953.
English Abstract of KR 10-2018-0107010.
English translation of Office Action dated Mar. 22, 2021, in corresponding Russian Patent Application No. 2020141619.
English translation of Office Action dated May 21, 2021 in corresponding Chinese Patent Application No. 201980040082.3, 11 pp.
English translation of Patent Search Report dated Mar. 19, 2021, issued in Russian Application No. 2020141619/04(077403).
Fialkov Yu. Ya. "Solvent as a means of controlling a chemical process", "Chemistry", 1990, 238 pp., Note: No English translation submitted.
https://normative_reference_dictionary.academic.ru/63548/РАСПЫЛИТЕЛЬНОЕ УСТРОЙСТВО [Spraying device], Wayback Internet Archive Machine, Sep. 17, 2016, 1 pp., Note: No English translation submitted.
Office Action dated Mar. 22, 2021, in corresponding Russian Patent Application No. 2020141619.
Office Action dated May 21, 2021 in corresponding Chinese Patent Application No. 201980040082.3, 9 pp.
Patent Search Report dated Mar. 19, 2021 issued in Russian Application No. 2020141619/04(077403).
Schmidt O. Yu. et al. The Great Soviet Encyclopedia, edition III, 1969-1978, 3 pp., Note: No English translation submitted.
Extended European Search Report dated Feb. 9, 2022 issued in correponding EP Patent Application No. 19855053.5, 7 pp.
Habiba Afrin, "A Review on Different Types Soil Stabilization Techniques", International Journal of Transportation Engineering andTechnology. vol. 3, No. 2, 2017, pp. 19-24. doi: 10.11648/j.ijtet.20170302.12, XP 55885722A N420714EP.
Acceptance decision with search report dated Mar. 24, 2020 of Russian patent application No. 2019131437/05, which corresponds to the above-identified patent application.
Acceptance decision with search report dated Mar. 25, 2020 in Russian Patent Application No. 2019131399/05, 9 pp.
CAS Registry No. 61839-17-6; STN Entry Date Nov. 16, 1984; L-Lysine, compounds, methylenebutanedioate (1:1). Retrieved on Apr. 15, 2020.
KR English Abstract of KR 10-2013-0046842. Note, corrected country code.
English Abstract of CA 1278132 (corresponds to EP 0196844).
English Abstract of CN 103599080.
English Abstract of CN 106906053.
English Abstract of JP 2002138161.
English Abstract of JP 2003-160693.

(56) References Cited

OTHER PUBLICATIONS

English Abstract of JP 2011-099099.
English Abstract of JP 2013-032482 (for JP 5959867).
English Abstract of JP 2014-074092.
English Abstract of KR 10-2007-0104446.
English Abstract of KR 10-2010-0137146.
English Abstract of RU 2110549.
English Language Translation of Office Action dated May 18, 2022, in corresponding CN Patent Application No. 201980040346.5, 8 pp.
English translation of Acceptance decision with search report dated Mar. 24, 2020 of Russian patent application No. 2019131437/05, which corresponds to the above-identified patent application.
English translation of Acceptance decision with search report dated Mar. 25, 2020 in Russian Patent Application No. 2019131399/05, 4 pp.
English Translation of Office Action dated May 19, 2021 in corresponding RU Patent Application No. 2020142628, 6 pp.
English Translation of Search Report dated Aug. 30, 2019, issued in RU 2020142628/04, 2 pp.
Extended European Search Report dated Dec. 10, 2020 of the European Patent Application No. 18770654, which corresponds to the above-identified application.
Extended European Search Report dated Feb. 2, 2022, issued in EP Patent Application No. 19855147.5, 80 pp.
Office Action dated May 14, 2019, issued in CN 201880000716.8, with English translation, 15 pp.
Office Action issued in TW Application No. 10720988390, dated Oct. 23, 2018, with Englsih translation, 11 pp.
Office Action dated May 18, 2022, in corresponding CN Patent Application No. 201980040346.5, 5 pp.
Office Action dated May 19, 2021 in corresponding RU Patent Application No. 2020142628, 7 pp.
Search Report (English Translation) issued in PCT/KR2018/003312, dated Jun. 28, 2018, 2 pp.
Search Report (English Translation) issued in PCT/KR2018/003314, dated Sep. 27, 2018, 2 pp.
Search Report dated Aug. 30, 2019, issued in RU 2020142628/04, 2 pp.

\* cited by examiner

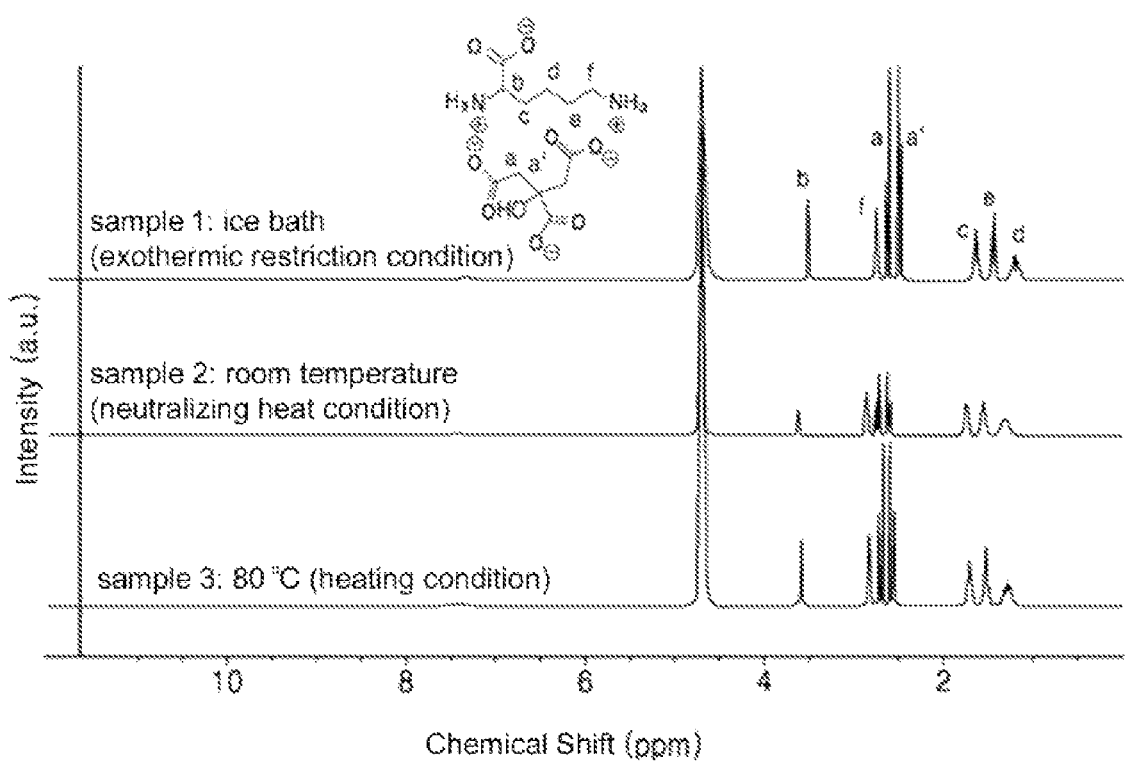

METHOD OF SUPPRESSING DUST GENERATION, SOIL STABILIZING COMPOSITION, AND SPRAY DEVICE INCLUDING SOIL STABILIZING COMPOSITION

CROSS-REFERENCE TO RELATED APPLICATION

This application is a national stage application of PCT/KR2019/011181, filed Aug. 30, 2019, which claims priority to Korean Patent Application No. 10-2018-0104009 filed on Aug. 31, 2018 and Korean Patent Application No. 10-2019-0105271 filed on Aug. 27, 2019, both of which are hereby incorporated by reference in their entirety.

TECHNICAL FIELD

The present application relates to a method of suppressing dust generation, a soil stabilizer composition, and a spraying device including the soil stabilizer composition.

BACKGROUND ART

Soil stabilizers generally contain inorganic salts to suppress dust generated in the soil or contain water-soluble polymers to improve the water absorbing property of the soil, as major components. Inorganic salts are easily removed from the surface horizon by rain and the like. Inorganic salt soil stabilizers such as $MgCl_2$ require continuous water supply to maintain dust suppression activity. When there is no water in the surface of the soil, inorganic soil stabilizers are deposited on the surface of the soil as a crystalline salt. In this case, inorganic soil stabilizers themselves are the source of the dust. Inorganic salt soil stabilizers are dissolved by rain and are easily removed from the surface horizon and flow into the river, etc., and thus have a negative influence on the aquatic ecosystem of, for example, the river. In addition, inorganic salt soil stabilizers corrode roads, steel structures, etc. existing on the surface of the soil to reduce their durability. The use of excessive inorganic salt soil stabilizers may cause environmental problems such as soil acidification and plant death.

Aqueous polymer soil stabilizers require a long time to decompose in the soil, and aqueous polymers and/or decomposers thereof may act as toxic components to the soil ecosystem, causing problems of environmental pollution.

Therefore, there is a need for a soil stabilizer that can suppress dust and improve water-holding properties of the soil without using inorganic salts or polymers as main components.

DESCRIPTION OF EMBODIMENTS

Technical Problem

One aspect of the present disclosure is to provide a method of suppressing dust generation that provides an excellent dust suppression capability.

Another aspect of the present disclosure is to provide a soil stabilizer composition that provides an excellent dust suppression capability and water-holding properties.

Another aspect of the present application is to provide a spraying device including a soil stabilizer composition.

Solution to Problem

Additional aspects will be set forth in part in the description which follows and, in part, will be apparent from the description, or may be learned by practice of the presented embodiments of the disclosure.

According to an aspect, provided is a method of suppressing dust generation, the method including preparing a soil stabilizer composition including a salt of lysine and citric acid; and a solvent; and spraying the soil stabilizer composition on soil.

According to another aspect, provided is a soil stabilizer composition including a salt of lysine and citric acid; and a solvent.

According to another aspect, provided is a spraying device including the soil stabilizer composition.

Advantageous Effects of Disclosure

The method of suppressing dust generation according to one embodiment provides excellent dust suppression capability by using a novel soil stabilizer composition.

The soil stabilizer composition according to another embodiment provides excellent dust suppression capability and hygroscopicity at the same time by having a novel composition containing an aqueous low molecular weight material as a main component.

BRIEF DESCRIPTION OF DRAWINGS

The above and other aspects, features, and advantages of certain embodiments of the disclosure will be more apparent from the following description taken in conjunction with:

FIG. 1 which shows the $^1H$ nuclear magnetic resonance spectrum (NMR) analysis results according to Reference Example 6.

BEST MODE

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, a method of suppressing dust generation, a soil stabilizer composition, a dilution thereof, and a dried product thereof, according to embodiments, will be described in more detail.

The term "adhesion" used herein refers to a tendency in which two different objects (except for gas) come close or contact each other and then pull each other. In other words, the term "adhesion" refers to a tendency in which two different objects (except for gases) require certain force (or work) to separate after they come close or contact each other.

The term "viscoelasticity" refers to a tendency in which when a force is applied to an object, a flow without a restoring force and an elastic deformation having a restoring force occur simultaneously, with respect to deformation. Materials with viscoelasticity have both solid and liquid properties.

The term "viscosity" used herein is derived from the internal friction between molecules and refers to a property to interfere with the flow of any material. Friction is the force that tries to prevent the difference in the distribution of flow velocity. Adhesion and viscosity are different properties. Materials with high viscosity may have little adhesion, and materials with low viscosity may have high adhesion.

In the present specification, the "soil stabilizer composition" is used to suppress the generation of fugitive dust and to suppress erosion by changing the binding of the soil particles or interparticle gaps so as to improve the physical and/or chemical properties of the soil, thereby ultimately stabilizing the soil.

The term "soil" used herein includes, in addition to the earth's surface or underground natural soils, dirts, or ground, laminates, for example, natural minerals such as coal, iron ore, calcium oxide, or the like; aggregates such as sand, gravel, or the like; processed minerals such as coke, cement, calcium hydroxide, or the like; synthetic compounds such as fertilizers or the like; and natural organic materials such as grains or the like. For example, the soil contains particles or grains of a size that are scattered by wind or the like.

The term "fugitive dust" refers to dust directly discharged to the atmosphere without an outlet from the source thereof.

A soil stabilizer composition according to an embodiment includes a salt of lysine and a salt of the citric acid; and a solvent. The salt of lysine and citric acid is a low molecular weight substance, but provide adhesion. Thus, the salt of lysine and citric acid is located between soil particles at the surface of the soil and/or inside the soil to bind them to stabilize the soil. Therefore, the dust generated from the soil is suppressed. In addition, a salt of lysine and citric acid have viscosity, and thus have water resistance so that they are not easily removed from inside the soil and/or the surface of the soil. Thus, the soil stabilizer provides soil stabilizing effects for a long time. In addition, the salt of lysine and citric acid binds to water in an aqueous solution and holds moisture inside the soil, and thus, provides soil stabilization effects for a long time. In addition, since the salt of lysine and citric acid is aqueous salts, it absorbs moisture in the air or inside the soil and has a capacity of binding to water and thus, prevents rapid drying of the soil. Since the salt of lysine and citric acid is low molecular weight substances, they are easily decomposed compared to polymers and are harmless to life and the environment, and thus, are environmentally friendly.

The soil stabilizer composition further includes at least one selected from, for example, a thickener, a tackifier, and a stabilizer.

The thickener increases the viscosity of the soil stabilizer composition. The thickener may be, for example, at least one selected from xanthan gum, guar gum, arabic gum, tragacanth gum, galactan, carob gum, karaya gum, carrageenan, acacia gum, mannan, quince seeds (marmelo), algae colloid (algae extract), starch (derived from rice, corn, potatoes, and the like), glycyrrhizin, alginin, sodium alginate, collagen, alginate, gelatin, Furcellaran, casein, locust bean gum, chitosan, albumin, dextran, succinoglucan, pullulan, tragacanthin, hyaluronic acid, pectin, alginic acid, agar, galactomannans, beta-cyclodextrin, amylase, polyethylene oxide (PEO), polyethylene glycol (PEG), polyvinylpyrrolidone (PVP), polyvinyl alcohol (PVA), polyacrylic acid (PAA), N-(2-hydroxypropyl)methacrylamide (HPMA), divinylether-maleic anhydride (DIVEMA), polyphosphate, polyphosphazene, methylcellulose, methylethylcellulose, ethylcellulose, microcrystalline cellulose, hydroxyethylcellulose, hydroxybutylmethylcellulose, hydroxypropylcellulose, hydroxypropylmethylcellulose, hydroxyethylmethylcellulose, hydroxypropylmethylcellulosestearoxy ether, carboxymethylhydroxyethylcellulose, alkylhydroxyethylcellulose, nonoxynylhydroxyethylcellulose, cellulose sodium sulfate, carboxymethylcellulose (CMC), lauric acid, and whelan gum. However, embodiments of the present disclosure are not limited to these, and any thickener that is used in the art is available herein.

An amount of the thickener in the soil stabilizer composition may be, based on 100 parts by weight, 10 parts by weight or less, 9 parts by weight or less, 8 parts by weight or less, 7 parts by weight or less, 6 parts by weight or less, 5 parts by weight or less, 4 parts by weight or less, 3 parts by weight or less, 2 parts by weight or less, 1 part by weight or less, or 0.1 parts by weight or less. Since the soil stabilizer composition has such ranges of thickener, increased dust suppression capability and/or water-holding capacities may be provided.

The tackifier may increase the adhesion of the soil stabilizer composition. The tackifier may include at least one selected from: rosin and its modified products, such as rosin, hydrogenated rosin, polymerized rosin, male rosin, rosin glycerin, modified phenolic resin, rosin acid, rosin ester, and the like; terpene-based resin, such as terpene resin, terpene-phenol resin, terpene-styrene resin, and the like; petroleum resin, such as C5 petroleum resin, C9 petroleum resin, bicyclic ronadiene petroleum resin, hydrogenated petroleum resin, and the like; resin emulsion, such as rosin emulsion, TPR water based resin, 2402 resin emulsion, petroleum resin emulsion, cumarone indene resin, and the like; phenolic resin, such as cashew oil modified phenolic resin, tall oil modified phenolic resin, and the like; and polymethylstyrene resin, ketonealdehyde resin, xylene formaldehyde resin, rubber, hexafluorozirconic acid, polylysine, glutaraldehyde, glyoxal, hexamethylenetetramine, butanetetracarboxylic acid, and aconic acid. However, embodiments of the present disclosure are not limited to these, and any tackifier that is used in the art is available herein.

An amount of the tackifier in the soil stabilizer composition may be, based on 100 parts by weight, 10 parts by weight or less, 9 parts by weight or less, 8 parts by weight or less, 7 parts by weight or less, 6 parts by weight or less, 5 parts by weight or less, 4 parts by weight or less, 3 parts by weight or less, 2 parts by weight or less, 1 part by weight or less, or 0.1 parts by weight or less. Since the soil stabilizer composition has such ranges of tackifier, increased dust suppression capability and/or water-holding capacities may be provided.

The stabilizer, for example, increases phase stability of the soil stabilizer composition by enhancing dispersion of active components of the soil stabilizer composition in aqueous composition solutions. The stabilizer may include, for example, at least one selected from monohydric alcohols, polyhydric alcohols, and polyhydric amines. The stabilizer may include at least one selected from, for example, glycerol, alkylene glycol, dialkylene glycol, benzenediol, benzenetriol, dialcoholamine, trialcoholamine, arabitol, mannitol, isomalt, xylitol, sorbitol, maltitol, erythritol, ribitol, dulsitol, lactitol, trytol, iditol, polyglycitol, methanol, ethanol, propane-2-ol, butan-1-ol, pentan-1ol, ethane-1,2-diol, propane-1,2-diol, propane-1,2,3-triol, butane-1,3-diol, butane-1,2,3,4-tetraol, pentane-1,2,3,4,5-pentol, hexane-1,2,3,4,5,6-hexol, heptane-1,2,3,4,5,6,7-heptol, prop-2-ene-1-ol, 3,7-dimethylocta-2,6-dien-1-ol, prop-2-yn-1-ol, cyclohexane-1,2,3,4,5,6-hexol, 2-(2-propyl)-5-methyl-cyclohexane-1-ol, a C2-C10 alkylenediamine, a C2-C10 alkenylenediamine, phenylenediamine, and n-amino(C1-05)alkyl(C1-05)alkanediamine. However, embodiments of the present disclosure are not limited to these materials, and any stabilizer that is used in the art is available herein.

An amount of the stabilizer in the soil stabilizer composition may be, based on 100 parts by weight of the soil stabilizer composition, 10 parts by weight or less, 9 parts by weight or less, 8 parts by weight or less, 7 parts by weight or less, 6 parts by weight or less, 5 parts by weight or less, 4 parts by weight or less, 3 parts by weight or less, 2 parts by weight or less, 1 part by weight or less, or 0.1 parts by weight or less. Since the soil stabilizer composition has such ranges of stabilizer, increased dust suppression capability and/or water-holding capacities may be provided.

The amount of the salt of lysine and citric acid in the soil stabilizer composition may be, based on a total weight of an organic solid content, 0.1 wt % or more, 0.5 wt % or more, 1 wt % or more, 2.5 wt % or more, 5 wt % or more, 10 wt % or more, 20 wt % or more, 30 wt % or more, 40 wt % or more, 50 wt % or more, 60 wt % or more, 70 wt % or more, 80 wt % or more, or 90 wt % or more. In one embodiment, based on 100 parts by weight of the solid content of the soil stabilizer composition, the sum of an amount of citric acid and an amount of lysine may be from about 0.1 parts by weight to about 100 parts by weight, about 0.5 parts by weight to about 100 parts by weight, about 1 part by weight to about 100 parts by weight, about 2.5 parts by weight to about 100 parts by weight, about 5 parts by weight to about 100 parts by weight, about 10 parts by weight to about 100 parts by weight, about 20 parts by weight to about 100 parts by weight, about 30 parts by weight to about 100 parts by weight, about 40 parts by weight to about 100 parts by weight, about 50 parts by weight to about 100 parts by weight, about 60 parts by weight to about 100 parts by weight, about 70 parts by weight to about 99 parts by weight, about 80 parts by weight to about 98 parts by weight, or about 85 parts by weight to about 97 parts by weight. Since the salt of lysine and citric acid has such ranges, dust suppression capability and/or water-holding capacities may be further improved.

In one embodiment, the soil stabilizer composition may be free from precipitates. Since the soil stabilizer composition does not contain precipitates, improved dust suppression capability and/or water-holding capacities may be obtained.

Precipitates may be precipitates of at least one selected from lysine, and citric acid. In one or more embodiments, these precipitates may include a case in which, as shown in Reaction Scheme 1, an insoluble salt (AB(s)) is obtained due to a chemical change of a lysine aqueous solution (A(aq)) and a citric acid aqueous solution (B(aq)), and a case in which, as shown in Reaction Scheme 2, lysine solid (A(s)) or citric acid solid (B(s)) precipitates from the lysine aqueous solution (A(aq)) or the citric acid aqueous solution (B(aq)) or lysine solid (A(s)) or citric acid solid (B(s)) does not dissolve in a solvent and remains in an unsoluble state. Also, this case further includes a case in which the thickener precipitates in the soil stabilizer composition or the thickener does not dissolve in a solvent and remains in an insoluble state.

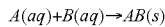  [Reaction Scheme 1]

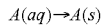  [Reaction Scheme 2]

The term "precipitates" used herein refer to precipitates produced before spraying the soil stabilizer composition, or during storage and distribution of the soil stabilizer composition.

The term "lysine" used herein is a kind of basic α-amino acid, and lysine may be biosynthesized from oxal acetic acid via the lysine biosynthetic pathway, or chemically synthesized.

Lysine may include one kind of lysine or a mixture of one or more kinds of lysine.

Lysine may be one or more selected from L-lysine represented by Formula 1, D-lysine represented by Formula 2, and a salt thereof.

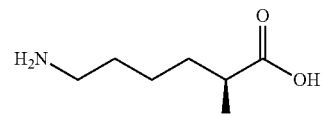  [Formula 1]

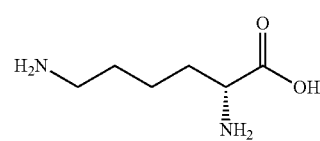  [Formula 2]

Lysine salt may include, for example, lysine sulfate, lysine acetate, lysine hydrochloride, lysine monohydrochloride, lysine dihydrochloride, lysine monohydrate, lysine acetylsalicylate, lysine phosphate, lysine diphosphate, lysine carbonate, or a mixture or combination thereof. These lysine salts may be converted to a lysine free form.

The conversion of lysine salts to lysine is known to those of ordinary skill in the art. In some embodiment, commercially available lysine raw materials may be used herein. For example, the lysine may be D-lysine, L-lysine and/or DL-lysine, and since these materials have identical or similar physiochemical properties, the adhesive compositions including these materials may also have identical or similar characteristics and thus are within the scope of the present disclosure.

The citric acid is one of the organic acids and may be represented by Formula 3.

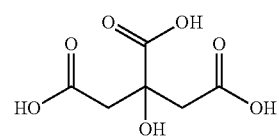  [Formula 3]

The salt of lysine and citric acid is present in the form of a salt solution in the soil stabilizer composition. When lysine, citric acid, and water are mixed, lysine and citric acid do not form covalent compounds or insoluble salts, but exist in the form of, for example, a salt solution.

In the soil stabilizer composition, the amounts of lysine, citric acid, and water may be controlled in such a way that lysine and citric acid do not form a crystal or precipitates. When the soil stabilizer composition retains a liquid state without forming crystals or precipitates, the soil stabilizer composition may have excellent dust suppression capability and/or water-holding properties and/or hygroscopicity and may be easily, uniformly applied to the soil. In the case in which the soil stabilizer composition is dried to form crystals, when moisture is applied thereto to retain its liquid phase, the soil stabilizer composition may have excellent dust suppression capability and/or water-holding properties, and may be used as a soil stabilizer.

The mixed mol ratio of lysine and citric acid may be 5:1 to 1:5. In some embodiments, the mixed mol ratio of lysine and citric acid may be from 5:1 to 1:5, 5:1 to 1:3, 5:1 to 1:2, 5:1 to 1:1.5, 5:1 to 1:1, 3:1 to 1:5, 3:1 to 1:3, 3:1 to 1:2, 3:1 to 1:1.5, 3:1 to 1:1, 1.5:1 to 1:5, 1.5:1 to 1:3, 1.5:1 to 1:2, 1.5:1 to 1:1.5, or 1.5:1 to 1:1. When the amount of lysine to citric acid is greater than or smaller than such ranges, the dust suppression capability and/or water-holding properties may be decreased or the storage stability or preservation stability of the soil stabilizer composition may be degraded.

The amount of a solid content in the soil stabilizer composition may be, based on 100 parts by weight of the soil stabilizer composition, 70 parts by weight or less, for example, from about 0.1 parts by weight to about 70 parts by weight, about 1 part by weight to about 70 parts by weight, about 1 part by weight to about 60 parts by weight, about 1 part by weight to about 50 parts by weight, about 1 part by weight to about 40 parts by weight, about 1 part by weight to about 30 parts by weight, about 1 part by weight to about 20 parts by weight, or about 1 part by weight to about 10 parts by weight. When the amount of the solid content is within such ranges, it is easy to apply the soil stabilizer composition on the soil, and when the amount of the solid content is 70 parts by weight or more, precipitates may be formed and thus the soil stabilizer composition may not be available. Even when the amount is of the solid content is decreased, since precipitates may not be formed and water-holding capacities may be maintained, the amount of the solid content may be adjusted to be from about 0.1 parts by weight to about 10 parts by weight according to a field to be applied.

The soil stabilizer composition may include citric acid and lysine in the form of a condensate containing the citric acid and the lysine as a unit. For example, the condensate may be a dimer, a trimer, or an oligomer, and the amount of the condensate may be, based on 100 parts by weight of the sum of the amount of citric acid and the amount of lysine, 20 parts by weight or less, 10 parts by weight or less, or 1 part by weight or less, and may include 0. When the condensate is included in such an amount greater than these upper limits, the water-holding properties of an adhesive composition may be reduced or the fluidity thereof may be decreased, leading to difficulties in obtaining uniform coating and maintaining a liquid state.

The reason why the soil stabilizer composition exhibits the adhesion property as described above will now be described in detail. This description of the adhesion property is merely for ease of understanding and is not intended to limit the scope of the present disclosure. The adhesion property may be explained for other reasons, within the scope of no scientific contradiction. The salt of lysine and citric acid may provide the adhesion property to the soil stabilizer composition by forming a kind of a network therein caused by a strong interaction, for example, between lysine and citric acid, among lysine, citric acid, and water, or among lysine, citric acid, water, and a thickener. Lysine has two amino groups and citric acid has three carbonyl groups. The non-covalent electron pair of the carbonyl groups of citric acid and hydrogen of the amino groups of lysine have strong interactions through an ionic hydrogen bond. In one embodiment, the non-covalent electron pair of the carbonyl groups of citric acid, hydrogen of the amino groups of lysine, and water have strong interactions through an ionic hydrogen bond. When the soil stabilizer composition is analyzed by liquid chromatography, lysine and citric acid may be identified as they are. This result shows that the lysine and citric acid in the soil stabilizer composition bind to each other by ionic hydrogen bonds and exist in the form of a salt of lysine and citric acid, that is, a salt solution of lysine and citric acid aqueous solution. The salt of lysine and citric acid in the soil stabilizer composition remains in a liquid state and provides excellent adhesive characteristics without precipitating into a crystal form (solid state) or the form of precipitates at room temperature (25° C.). Due to the adhesion property, the soil stabilizer composition may have dust suppression capability and water-holding properties.

The solvent for the soil stabilizer composition may be an aqueous solvent. The aqueous solvent may include at least one selected from, for example, water and alcohols. In one embodiment, the aqueous solvent may include water as a main component and alcohol as an auxiliary component.

In one embodiment, the aqueous solvent may include one or more alcohol solvents selected from deionized water, primary alcohols, polyhydric alcohols, diols, and triols. The mixed weight ratio of deionized water to alcohol in the soil stabilizer composition may be, for example, 1:1 to 10:0, 1:1 to 10:1, 1:1 to 5:1, or 1:1 to 3:2. The alcohol solvent may be, for example, a monohydric alcohol, a polyhydric alcohol, a unsaturated aliphatic alcohol, an alicyclic alcohol, or a mixture thereof. The monohydric alcohol may include, for example, one or more alcohol selected from methanol, ethanol, propane-2-ol, butane-1-01, pentane-1-01, and hexadecan-1-ol. The polyhydric alcohol may include, for example, at least one selected from ethane-1,2-diol, propane-1,2-diol, propane-1,2,3-triol, butane-1,3-diol, butane-1,2,3,4-tetraol, pentane-1,2,3,4,5-pentol, hexane-1,2,3,4,5,6-hexol, and heptane-1,2,3,4,5,6,7-heptol. The unsaturated aliphatic alcohol may include at least one selected from, for example, prop-2-ene-1-ol, 3,7-dimethylocta-2,6-dien-1-ol, prop-2-yn-1-ol, cyclohexane-1,2,3,4,5,6-hexol, and 2-(2-propyl)-5-methyl-cyclohexane-1-ol. The alicyclic alcohol may include at least one selected from, for example, cyclopentanol, cyclohexanol, and cycloheptanol.

The pH of the soil stabilizer composition may be from about 2 to about 11, about 2 to about 9.5, or about 2 to about 8.5. As the soil stabilizer composition has such pH ranges, the storage stability and preservation stability of the soil stabilizer composition are improved and the long-term storage performance thereof is improved. The soil stabilizer composition has excellent adhesion properties and no sedimentation even after long-term storage, in addition to immediately after manufacture. For example, the soil stabilizer composition retains its stability even after storage or distribution of, for example, 14 days or more, 2 months or more, 6 months or more, 12 months or more, or 24 months or more, and does not produce precipitates and properties thereof are not changed. In addition, the temperature of the environment where the soil stabilizer composition is stored may be from about −18° C. to about 80° C., for example, about −18° C. to about 45° C., about 0° C. to about 60° C., about 0° C. to about 45° C., about 0° C. to about 40° C., or about 20° C. to about 40° C. Even in the case of storage outside these temperature ranges, when the temperature of the environment in which the soil stabilizer composition is used is within the above temperature ranges, the formulation and quality thereof may not be affected. For example, when stored at a low temperature, the soil stabilizer composition needs to be left at room temperature for some time before use.

When the amount of the solid content of the salt of lysine and citric acid is 10 parts by weight or more based on 100 parts by weight of the soil stabilizer composition, the soil stabilizer composition has a viscosity of, for example, 1.0 mPa·s and the initial tack is 0.1 mJ or more, at room temperature (e.g., 25° C.±1° C.). For example, when the amount of the solid content of the salt of lysine and citric acid is 10 parts by weight or more based on 100 parts by weight of the soil stabilizer composition, the soil stabilizer composition has a viscosity of, for example, about 1.0 mPas to about 5000 mPas, about 1.0 mPas to about 3000 mPas, about 1.0 mPa·s to about 2000 mPas, about 1.0 mPa·s to about 1000 mPas, about 1.0 mPas to about 900 mPa·s, about 1.0 mPas to about 800 mPas, about 1.0 to about 700 mPas, about 1.0 mPa·s to about 600 mPas, about 1.0 mPas to about 500 mPa·s, about 1.0 mPas to about 400 mPas, about 1.0 mPas to about 300 mPas, about 1.0 mPas to about 200 mPas, about 1.0 mPas to about 100 mPas, about 1.0 mPas to about 90 mPas, or about 1.0 mPas to about 50 mPas, at room temperature (e.g., 25° C.±1° C.). When the soil stabilizer composition has such ranges of viscosity, the dust generation may be effectively suppressed.

When the amount of the solid content of the salt of lysine and citric acid is 10 parts by weight or more based on 100 parts by weight of the soil stabilizer composition, the soil stabilizer composition has the initial tack of, for example, about 0.1 mJ to about 20 mJ, about 0.1 mJ to about 15 mJ, about 0.1 mJ to about 10 mJ, about 0.1 mJ to about 5 mJ, about 0.1 mJ to about 4 mJ, about 0.1 mJ to about 3 mJ, about 0.1 mJ to about 2 mJ, about 0.1 mJ to about 1 mJ, or about 0.1 mJ to about 0.5 mJ, at room temperature (e.g., 25° C.±1° C.). When the soil stabilizer composition has such ranges of initial tack, the dust generation may be effectively suppressed.

Since the soil stabilizer composition includes a thickener, improved viscosity and/or initial tacks may be obtained compared to compositions containing salts of lysine and citric acid alone. The soil stabilizer composition including the thickener may have, for example, a viscosity of 50.0 mPa·s or more and an initial tack of 1.0 mJ or more. The soil stabilizer composition including the thickener may be, at room temperature (e.g., 25° C.±1° C.), a viscosity of, for example, about 50.0 mPas to about 50000 mPas, about 50.0 mPas to about 30000 mPas, about 50.0 mPas to about 20000 mPas, about 50.0 mPas to about 10000 mPas, about 50.0 mPas to about 5000 mPas, about 50.0 mPas to about 3000 mPas, about 50.0 mPas to about 1000 mPas, about 50.0 mPa·s to about 800 mPas, about 50.0 mPas to about 600 mPas, about 50.0 mPa·s to about 400 mPas, about 50.0 mPas to about 300 mPa·s, about 50.0 mPas to about 200 mPas, or about 50.0 mPas to about 100 mPa·s. The soil stabilizer composition including the thickener may have, at room temperature (e.g., 25° C.±1° C.), an initial tack of, for example, about 1.0 mJ to about 50 mJ, about 1.0 mJ to about 40 mJ, about 1.0 mJ to about 30 mJ, about 1.0 mJ to about 20 mJ, about 1.0 mJ to about 10 mJ, or about 1.0 mJ to about 5.0 mJ.

When the amount of the solid content of the salt of lysine and citric acid is 0.1 parts by weight or more based on 100 parts by weight of the soil stabilizer composition, the soil stabilizer composition may have a relative water-holding property represented by Formula 4 of, for example, 1% or more with respect to water (i.e., control F).

When the amount of the solid content of the salt of lysine and citric acid is 0.1 parts by weight or more based on 100 parts by weight of the soil stabilizer composition, the soil stabilizer composition may have a relative efficiency of water-holding capacity represented by Formula 4 of, for example, about 1.0% to about 300%, about 1.0% to about 200%, about 1.0% to about 150%, about 1.0% to about 100%, about 1.0% to about 50%, about 10% to about 300%, about 10% to about 200%, about 10% to about 150%, about 20% to about 300%, about 20% to about 200%, about 20% to about 150%, about 30% to about 300%, about 30% to about 200%, about 30% to about 150%.

When the amount of the solid content of the salt of lysine and citric acid is 1 part by weight or more based on 100 parts by weight of the soil stabilizer composition, the soil stabilizer composition may have a relative efficiency of water-holding capacity represented by Formula 4 of, for example, about 1.0% to about 300%, about 1.0% to about 200%, about 1.0% to about 150%, about 1.0% to about 100%, about 1.0% to about 50%, about 10% to about 300%, about 10% to about 200%, about 10% to about 150%, about 20% to about 300%, about 20% to about 200%, about 20% to about 150%, about 30% to about 300%, about 30% to about 200%, or about 30% to about 150%.

When the amount of the solid content of the salt of lysine and citric acid is 5 part by weight or more based on 100 parts by weight of the soil stabilizer composition, the soil stabilizer composition may have a relative efficiency of water-holding capacity represented by Formula 4 of, for example, about 1.0% to about 300%, about 1.0% to about 200%, about 1.0% to about 150%, about 10% to about 300%, about 10% to about 200%, about 10% to about 150%, about 20% to about 300%, about 20% to about 200%, about 20% to about 150%, about 30% to about 300%, about 30% to about 200%, or about 30% to about 150%.

When the amount of the solid content of the salt of lysine and citric acid is 10 part by weight or more based on 100 parts by weight of the soil stabilizer composition, the soil stabilizer composition may have a relative efficiency of water-holding capacity represented by Formula 4 of, for example, about 1.0% to about 300%, about 1.0% to about 200%, about 1.0% to about 150%, about 10% to about 300%, about 10% to about 200%, about 10% to about 150%, about 20% to about 300%, about 20% to about 200%, about 20% to about 150%, about 30% to about 300%, about 30% to about 200%, or about 30% to about 150%.

When the amount of the solid content of the salt of lysine and citric acid is 0.1 parts by weight or more based on 100 parts by weight of a soil stabilizer composition that includes or does not include the thickener, the soil stabilizer composition may have a compressive strength of, for example, 17 kgf or more, with respect to water (i.e. control F), wherein the compressive strength is obtained after drying at a temperature of 60° C. according to 3) a soil compression drying evaluation method described in Example 5.

When the amount of the solid content of the salt of lysine and citric acid is 0.1 parts by weight or more based on 100 parts by weight of the soil stabilizer composition, the soil stabilizer composition may have a compressive strength of, for example, about 17 kgf to about 2000 kgf, or about 17 kgf to about 1500 kgf, with respect to water (i.e. distilled water), wherein the compressive strength is obtained after drying at a temperature of 60° C. according to 3) a soil compression drying evaluation method described in Example 5.

When the amount of the solid content of the salt of lysine and citric acid is 1 part by weight or more based on 100 parts by weight of the soil stabilizer composition, the soil stabilizer composition may have a compressive strength of, for example, about 17 kgf to about 2500 kgf, about 17 kgf to about 2000 kgf, or about 17 kgf to about 1500 kgf, with respect to water (i.e. distilled water), wherein the compressive strength is obtained after drying at a temperature of 60° C. according to 3) a soil compression drying evaluation method described in Example 5.

When the amount of the solid content of the salt of lysine and citric acid is 5 parts by weight or more based on 100 parts by weight of the soil stabilizer composition, the soil stabilizer composition may have a compressive strength of, for example, about 17 kgf to about 5000 kgf, about 17 kgf to about 2500 kgf, about 17 kgf to about 2000 kgf, or about 17 kgf to about 1500 kgf, with respect to water (i.e. distilled water), wherein the compressive strength is obtained after drying at a temperature of 60° C. according to 3) a soil compression drying evaluation method described in Example 5.

When the amount of the solid content of the salt of lysine and citric acid is 10 parts by weight or more based on 100 parts by weight of the soil stabilizer composition, the soil stabilizer composition may have a compressive strength of, for example, about 17 kgf to about 10000 kgf, about 17 kgf to about 5000 kgf, about 17 kgf to about 2500 kgf, about 17 kgf to about 2000 kgf, or about 17 kgf to about 1500 kgf, with respect to water (i.e. distilled water), wherein the compressive strength is obtained after drying at a temperature of 60° C. according to 3) a soil compression drying evaluation method described in Example 5.

When the amount of the solid content of the salt of lysine and citric acid is 20 parts by weight or more based on 100 parts by weight of the soil stabilizer composition, the soil stabilizer composition may have a compressive strength of, for example, about 17 kgf to about 15000 kgf, about 17 kgf to about 10000 kgf, about 17 kgf to about 5000 kgf, about 17 kgf to about 2500 kgf, about 17 kgf to about 2000 kgf, or about 17 kgf to about 1500 kgf, with respect to water (i.e. distilled water), wherein the compressive strength is obtained after drying at a temperature of 60° C. according to 3) a soil compression drying evaluation method described in Example 5.

When the amount of the solid content of the salt of lysine and citric acid is 30 parts by weight or more based on 100 parts by weight of the soil stabilizer composition, the soil stabilizer composition may have a compressive strength of, for example, about 17 kgf to about 20000 kgf, about 17 kgf to about 15000 kgf, about 17 kgf to about 10000 kgf, about 17 kgf to about 5000 kgf, about 17 kgf to about 2500 kgf, about 17 kgf to about 2000 kgf, or about 17 kgf to about 1500 kgf, with respect to water (i.e. distilled water), wherein the compressive strength is obtained after drying at a temperature of 60° C. according to 3) a soil compression drying evaluation method described in Example 5.

When the amount of the solid content of the salt of lysine and citric acid is 40 parts by weight or more based on 100 parts by weight of the soil stabilizer composition, the soil stabilizer composition may have a compressive strength of, for example, about 17 kgf to about 25000 kgf, about 17 kgf to about 20000 kgf, about 17 kgf to about 15000 kgf, about 17 kgf to about 10000 kgf, about 17 kgf to about 5000 kgf, about 17 kgf to about 2500 kgf, about 17 kgf to about 2000 kgf, or about 17 kgf to about 1500 kgf, with respect to water (i.e. distilled water), wherein the compressive strength is obtained after drying at a temperature of 60° C. according to 3) a soil compression drying evaluation method described in Example 5.

When the amount of the solid content of the salt of lysine and citric acid is 50 parts by weight or more based on 100 parts by weight of the soil stabilizer composition, the soil stabilizer composition may have a compressive strength of, for example, about 17 kgf to about 30000 kgf, about 17 kgf to about 25000 kgf, about 17 kgf to about 20000 kgf, about 17 kgf to about 15000 kgf, about 17 kgf to about 10000 kgf, about 17 kgf to about 5000 kgf, about 17 kgf to about 2500 kgf, about 17 kgf to about 2000 kgf, or about 17 kgf to about 1500 kgf, with respect to water (i.e. distilled water), wherein the compressive strength is obtained after drying at a temperature of 60° C. according to 3) a soil compression drying evaluation method described in Example 5.

The soil stabilizer composition may further include, when needed, one or more additive selected from a reactive diluent, an emulsifier, a plasticizer, a filler, an anti-aging agent, a curing accelerator, a flame retardant, a coagulant, a surfactant, a thickener, a ultraviolet (UV) blocking agent, an elastomer, a pigment, a dye, a fragrance, an anti-static agent, an anti-blocking agent, a slip agent, an inorganic filler, a kneading agents, a stabilizer, a reforming resin, a coupling agent, a leveling agent, a fluorescent brightener, a dispersant, a heat stabilizer, an optical stabilizer, a UV absorber, a wax, a wetting agent, an antioxidant, a preservative, and a lubricant. The total amount of the additive is not particularly limited, and various additives may be available in various weight ranges depending on the application. The amounts of the additives described above are at such levels that are commonly used in the art.

A reactive diluent refers to a diluent that helps respective components of a composition uniformly coated on a subject to which the composition is applied, and may be at least one selected from, for example, n-butylglycidylether, aliphaticglycidylether, 2-ethylhexylglycidylether, phenylglycidylether, 0-cresylglycidylether, nonylphenylglycidylether, p-tertbutylphenylglycidylether, 1.4-butanedioldiglycidylether, 1.6-hexanedioldiglycidylether, neopentylglycidylether, 1.4-cyclohexanedimethyloldiglycidylether, polypropyleneglycoldiglycidylether, ethyleneglycoldiglycidylether, polyethyleneglycoldiglycidylether, diethyleneglycoldiglycidylether, resorcinoldiglycidylether, hydrogenated bisphenol A glycidylether, trimethylolpropenetriglycidylethyr, glycerolpolyglycidylether, diglycerolpolyglycidylether, penteritriolpolyglycidylether, castor oil glycidylether, sorbitolpolyglycidylether, neodcanoic acid glycidylether, diglycidyl-1.2-cyclohexanedicarboxylate, diglycidyl-O-phthalate,N,N-diglycidylamine, N,N-diglycidyl-O-toludiene, triglycidyl-p-aminophenol, tetraglycidyldiaminodiphenylmethane, triglycidyl-isocyanate, 1.4-butanedioldiglycidylether, 1.6-hexanedioldiglycidylether, polypropyleneglycidyldiglycidylether, and triethylrolpropenetriglycidylether.

The emulsifier may include at least one selected from, for example, polyoxyethylene and a copolymer of polyoxypropylene, polyoxyethylene and a copolymer of polyoctylphenylether, and sodium dodecylbenzenesulphide.

The plasticizer may improve a processing flow or stretching. The plasticizer may also improve the electrical insulation, adhesion property, cold resistance, light resistance, oil resistance, soap-resistant, flame retardant and flame resistance, thermal stability, ease of processing (intramolecularactivity), activity (intermolecular activity), and non-toxicity of a composition.

The plasticizer for improving the cold resistance property and the like may be, for example, dioctyl adipate (DOA), dioctyl azelate (DOZ), dioctyl sebacate (DOS), flexol TOF (UCC Inc.), or polyethylene glycol ester. The plasticizer for improving heat resistance (non-volatile) and non-performance may be, for example, polyester, a polymer blend, such as nitrile butadiene rubber (NBR), trimellitic acid ester, or pentaerythritol ester. The plasticizer for improving light resistance properties may be, for example, DOP, DOA, DOS, polyester, epoxidized soybean oil (ESBO), or the like.

The plasticizer for improving oil resistance may be, for example, phosplex aromatic phosphate ester (product name:

TPP, TCP, 112(CDP), 179A(TXP)), polyesters, or NBR, and the plasticizer for improving soap-resistance properties may be, for example, TCP, ESBO, or polyesters.

The plasticizer for improving the flame retardant and flame resistance properties may be, for example, phosphate, such as TCP, TXP, etc., paraffin chloride, alkyl chloride stearate, or NBR, and the plasticizer for thermal stability may be ESBO, DOZ, DOS, DOP, polyethylene glycol ester, or the like.

The plasticizer for ease of processing may be, for example, DOA. BBP, TOF, TCP, or octyldiphenyl phosphate, and the plasticizer for activity may be, for example, DOZ, DOS, dibasic lead phosphate (DLP), ESBO, or polyethyleneglycolester.

The plasticizer for and non-toxicity may be BPBG, octyldiphenyl phosphate, ESBO, citric acid ester, NBR, or the like.

The plasticizer may be dibutylphthalate (DBP), dihexylphthalate (DHP), di-2-ethylhexylphthalate (DOP), di-n-octylphthalate (DnOP), diisooctylphthalate (DIOP), didecylphthalate (DDP), diisodecylphthalate (DIDP), C8-C10 mixed higher alcoholphthalate, butylbenzylphthalate (BBP), dioctyladipate (DOA), dioctyl azelate (DOZ), dioctyl sebacate (DOS), tricresyl phosphate (TCP), tri kisylenylphosphate (TXP), monooctyldiphenylphosphate (Santicizer141), monobutyl-dixylenylphosphate, trioctyl phosphate (TOF), aromatic oil, polybutene, paraffin, or the like.

The surfactant may be any surfactant that is commonly used in the art. For example, the surfactant may be a $C_8$-$C_{18}$ alkyl sulfate, a $C_8$-$C_{18}$ alkyl ether sulfate or alkylaryl ether sulfate having 40 or less of ethyleneoxide units or propyleneoxide units in hydrophobic groups, a $C_8$-$C_{18}$ alkyl sulfonate, an alkylaryl sulfonate, an ester and semiester of sulfosuccinic acid having monohydric alcohol or alkylphenol, a $C_8$-$C_{40}$ alkyl polyglycol ether or alkylaryl polyglycol ether having ethyleneoxide units, or the like. For example, sodium dodecyl sulfate (SDS), Na-silicate, or the like may be used.

Fillers are added to improve the strength, durability and workability of a composition, and may be, for example, calcium carbonate, talc, ceramic, silica, dolomite, clay, titanium white, galvanized, carbon (anti shrink, anti blocking), potassium carbonate, titanium oxide, liquid polysulfide polymer, volatile diluents, magnesium oxide, processing oil, etc.

Examples of the curing accelerator include dibutyltin dilaurate, JCS-50 (manufactured by Johoku Chemical Co., Ltd.), and formate TK-1 (manufactured by Mitsui Chemical Co., Ltd.). The antioxidant may be, for example, dibutyl hydroxytoluene (BHT), Irganox (registered trademark) 1010, Irganox (registered trademark) 1035FF, Irganox (registered trademark) 565 (all are products of Chiba Specialty Chemicals, Inc.).

The anti-static agent is not particularly limited, and may be 1-hexyl-4-methylpyridiniumhexafluorophosphate, dodecylpyridinium hexafluorophosphate, fluorinated organometallic compound (for example, HQ-115 from 3M Co., Ltd), alkali metal salt (for example, $NaPF_6$, $NaSbF_6$, $KPF_6$, or KSbFe), a conductive polymer (for example, polythiophene (PEDOT of Bayer Co., Ltd), polyaniline, or polypyrrole), metal oxide (for example, indium-doped tin oxide (ITO), antimony-doped tin oxide (ATO), tin oxide, zinc oxide, antimony oxide, or indium oxide), a quaternary ammonium salt (for example, poly(acrylamide-co-diallyldimethylammonium chloride) solution of Sigma-Aldrich Co., Ltd), 1-butyl-3-methyl imidazolium hexafluorophosphate [BMIM][$PF_6$], 1-butyl-3-(2-hydroxyethyl)imidazoliumbis (trifluoromethanesulfonyl) imide[BHEIM][$NTf_2$], tetrabutylmethylammonium bis (trifluoromethanesulfonyl) imide[TBMA][$NTf_2$], and these materials may be used alone or in combination of two or more thereof.

Elastomer is a rubber or a polymer having the property of elastomer, and may be, for example, ethylene-vinyl acetate copolymer, acrylic rubber, natural rubber, isoprene rubber, styrene butadiene rubber, chloroprene rubber, butyl rubber, ethylene-propylene rubber, styrene-ethylene-butylene-styrene copolymer, or acrylonitrile-butadiene copolymer.

The fluorescent brightener may be a benzooxazole compound, a benzothiazole compound, or a benzoimidazole compound.

The pigment may be a natural or synthetic pigment, and according to other classification references, the pigment may be an inorganic or organic pigment.

The fragrance may be, for example, but not limited to, peppermint oil, spearmint oil, carvone, or menthol, which are used separately or in combination.

The flame retardant may be melamine cyanurate, magnesium hydroxide, lead stone, zeolite, soda silicate, aluminum hydroxide, antimony, or the like. The additive for improving water resistance may be glyoxal.

Examples of modified resins include polyol resins, phenol resins, acrylic resins, polyester resins, polyolefin resins, epoxy resins, epoxidized polybutadiene resins, and the like.

Coupling agents may improve adhesion and adhesion reliability between an adhesive composition and a packaging material. The addition of such a coupling agent may improve adhesion reliability when a composition is left for a long time under high temperature and/or high humidity conditions. Examples of the coupling agent are silane compounds, such as γ-glycidoxypropyltriethoxy silane γ-glycidoxypropyl trimethoxy silane, γ-glycidoxypropyl methyldiethoxy silane, γ-glycidoxypropyl triethoxy silane, 3-mercaptopropyltrimethoxy silane, vinyltrimethoxysilane, vinyltriethoxy silane, γ-methacryloxypropyltrimethoxy silane, γ-methacryloxy propyl triethoxy silane, γ-aminopropyl trimethoxy silane, γ-aminopropyl triethoxy silane, 3-isocyanatopropyl triethoxy silane, γ-acetoacetatepropyltrimethoxysilane, γ-acetoacetatepropyl triethoxy silane, β-cyanoacetyl trimethoxy silane, β-cyanoacetyltriethoxy silane, or acetoxyacetotrimethoxysilane.

The kneading agent may be an aromatic hydrocarbon resin.

The anti-aging agent may be N-(1,3-dimethylbutyl)-N'-phenyl-p-phenylenediamine.

The wetting agent may be one or a mixture of for example, a saccharide, glycerin, sorbitol aqueous solution and an amorphous sorbitol aqueous solution.

The UV absorber may be ethylhexyl methoxycinnamate (for example, 2-ethylhexyl 4-methoxycinnamate), ethylhexyl salicylate, 4-methylbenzylidene camphor, isoamyl p-methoxycinnamate, octocrylene, phenylbenzimidazolesulfonic acid, homosalate, synoxate, ethylhexyltrizone, polysilicone-15, TEA-salicylate, PABA, ethylhexyl dimethylpava, or glyceryl PAVA. These may be used alone or in combination of 2 or more thereof.

A method of suppressing dust generation according to an embodiment may include preparing a soil stabilizer composition including the salt of lysine and citric acid and a solvent; and spraying the prepared soil stabilizer composition onto the soil.

By spraying the soil stabilizer composition including the salt of lysine and citric acid and the solvent onto the soil, the generation of dust from the soil is suppressed and the water-holding properties of the soil may be improved. Thus, the soil is stabilized.

The soil stabilizer composition used in the method of suppressing dust generation may further include one or more selected from a thickener, a stabilizer, and a tackifier. The thickener, the stabilizer, and the tackifier may be understood by referring to the description presented in connection with the soil stabilizer composition.

The mixed mol ratio of lysine and citric acid in the soil stabilizer composition used in the method of suppressing dust formation may be from 5:1 to 1:5. In some embodiments, the mixed mol ratio of lysine and citric acid may be from 5:1 to 1:5, 5:1 to 1:3, 5:1 to 1:2, 5:1 to 1:1.5, 5:1 to 1:1, 3:1 to 1:5, 3:1 to 1:3, 3:1 to 1:2, 3:1 to 1:1.5, 3:1 to 1:1, 1.5:1 to 1:5, 1.5:1 to 1:3, 1.5:1 to 1:2, 1.5:1 to 1:1.5, or 1.5:1 to 1:1. When the amount of lysine to citric acid is greater than or smaller than such ranges, the dust suppression capability and/or water-holding properties may be decreased or the storage stability or preservation stability of the soil stabilizer composition may be degraded.

The method of suppressing dust formation may further include controlling the amount of the solid content in the soil stabilizer composition to be, based on 100 parts by weight of the soil stabilizer composition, from about 0.1 parts by weight to about 70 parts by weight, about 0.1 parts by weight to about 60 parts by weight, about 0.1 parts by weight to about 50 parts by weight, about 0.5 parts by weight to about 50 parts by weight, about 0.5 parts by weight to about 40 parts by weight, about 0.5 parts by weight to about 30 parts by weight, about 0.5 parts by weight to about 20 parts by weight, about 0.5 parts by weight to about 10 parts by weight, or about 1 part by weight to about 5 parts by weight. By controlling the amount of the solid content within these ranges, the dust generation from soil may be effectively suppressed and the water-containing properties of the soil may be improved.

In the method of suppressing dust formation, the quantity of the soil stabilizer composition sprayed onto the soil may be from about 0.1 L/m$^2$ to about 5 L/m$^2$, about 0.5 L/m$^2$ to about 5 L/m$^2$, about 0.5 L/m$^2$ to about 4 L/m$^2$, about 0.5 L/m$^2$ to about 3 L/m$^2$, about 1 L/m$^2$ to about 3 L/m$^2$, or about 1.5 L/m$^2$ to about 2.5 L/m$^2$. By controlling the quantity for spray amount within these ranges, the dust generation from soil may be effectively suppressed and the water-containing properties of the soil may be improved.

In the method of suppressing dust formation, the preparing of the soil stabilizer composition may include mixing lysine, citric acid, and water and stirring the mixture at a temperature of 80° C. or less.

First, the soil stabilizer composition is prepared by preparing a mixture of lysine, citric acid, and water, and stirring the prepared mixture at a temperature of 80° C. or less.

When the stirring the prepared mixture is carried out outside the temperature range of more than 80° C., by-product materials and impurities may be formed, and, in some cases, it may be difficult to obtain the desired soil stabilizer composition. The stirring at a temperature of 80° C. or less may be carried out at a temperature of, for example, about 0° C. to about 80° C., about 0° C. to about 75° C., about 0° C. to about 70° C., about 0° C. to about 65° C., or about 0° C. to about 60° C. The stirring at a temperature of 80° C. or less may include, for example, i) a first step of mixing at a temperature of 0° C. to about 80° C., about 0° C. to about 75° C., about 0° C. to about 70° C., or about 0 to about 60° C., and ii) a second step of cooling at room temperature (about 20° C. to about 30° C.).

Regarding the mixing of lysine, citric acid, and water, citric acid may be added to an aqueous solution of lysine or lysine, citric acid, and water may be mixed at the same time. In the preparing of the soil stabilizer composition, one or more selected from the thickener, the stabilizer, the tackifier may be further added. The thickener may be used in the form of a thickener solution dissolved in water. The soil stabilizer composition may further include a process of removing the water and the solvent by concentrating under reduced pressure to control the amount of the solid content to be in a certain range.

A spraying device according to another embodiment includes the soil stabilizer composition described above.

For example, the spraying device may include a nozzle through which the soil stabilizer composition is sprayed and a container for diluting or storing the soil stabilizer composition. The soil stabilizer composition contained in the container may be moved to the nozzle and sprayed therethrough to the outside. The container and the nozzle may be connected by a supplier and do not necessarily have to be adjacent to each other. For example, in a coal mine, the container is located on the ground, the nozzle is located underground, and the container and nozzle may be connected by the supplier such as a hose. The type of the spraying device is not particularly limited and the spraying device may be manual or automatic, large or small, mobile or stationary. The spraying device may be a vehicle, a helicopter, an airplane, or the like.

The soil stabilizer composition may be pre-manufactured and then added to the spraying device, or a raw material therefor is added to the container and the soil stabilizer composition is prepared or diluted directly in the container. Alternatively, raw materials for the soil stabilizer composition may be supplied to the nozzle through separate pipes and then mixed therein to prepare and spray the soil stabilizer composition to the outside at the same time.

The dry product of the soil stabilizer composition according to another embodiment contains the salt of lysine and citric acid and is solid at room temperature. When the soil stabilizer composition or the dilution of the soil stabilizer composition described above is applied to the soil and then the solvent is removed therefrom by evaporation, the dry product of the soil stabilizer composition may be obtained. The dry product of the soil stabilizer composition includes the salt of lysine and citric acid, which is placed on at least one position selected from on the surface of the soil surface and inside the soil. For example, the salt of lysine and citric acid may be coated on the surface of the particles that constitute the soil or placed among the particles to bind the particles. When moisture is added, the dry product may be restored to an aqueous solution. The dry product of the soil stabilizer composition may further include, for example, a thickener in addition to the salt of lysine and citric acid. Since the dry product of the soil stabilizer composition includes the thickener, dust suppression capability and/or water-holding properties may be further improved.

MODE OF DISCLOSURE

Hereinafter, the following examples will be described in more detail, but the present disclosure is not limited to the following examples.

[Example 1A] Preparation of the Soil Stabilizer Composition Including the Salt of Lysine and Citric Acid, and Thickener: A Mol Ratio of Lysine and Citric Acid was 1.5:1 and an Amount of the Solid Content of Lysine and Citric Acid was 50 wt %

53.33 g of Distilled water (DIW) was added to 100 g of 54 wt % L-lysine free form aqueous solution and then, stirred at room temperature (25° C.) for 30 minutes while lysine was diluted. 47.31 g of citric acid (CA) and xanthan gum were slowly added to the diluted lysine at room temperature (25° C.) while stirring for 1 hour. Then, the resultant was stirred at a temperature of 60° C. for 1 hour. Subsequently, after the reaction mixture reached room temperature (25° C.), the reaction was terminated to obtain 202.62 g of the soil stabilizer composition. The amount of the solid content of lysine and citric acid in the soil stabilizer composition was about 50 parts by weight based on 100 parts by weight of the soil stabilizer composition, and the mixed mol ratio of lysine to citric acid was 1.5:1. The amount of xanthan gum was 0.977 wt % based on the total weight of the soil stabilizer composition and the solvent was deionized water.

[Example 1B] Preparation of the Soil Stabilizer Composition Including the Salt of Lysine and Citric Acid, Thickener and Stabilizer: A Mol Ratio of Lysine and Citric Acid was 3:1 and an Amount of the Solid Content of Lysine and Citric Acid was 50 wt %

The soil stabilizer composition was prepared in the same manner as used to prepare Example 1A, except that the mol ratio of lysine to citric acid was 3:1.

[Example 1C] Preparation of the Soil Stabilizer Composition Including the Salt of Lysine and Citric Acid, Thickener and Stabilizer: A Mol Ratio of Lysine and Citric Acid was 1:3 and an Amount of the Solid Content of Lysine and Citric Acid was 50 wt %

The soil stabilizer composition was prepared in the same manner as used to prepare Example 1A, except that the mol ratio of lysine to citric acid was 1:3.

[Example 1 D] Preparation of the Soil Stabilizer Composition Including the Salt of Lysine and Citric Acid, Thickener and Stabilizer: A Mol Ratio of Lysine and Citric Acid was 5:1 and an Amount of the Solid Content of Lysine and Citric Acid was 50 wt %

The soil stabilizer composition was prepared in the same manner as used to prepare Example 1A, except that the mol ratio of lysine to citric acid was 5:1.

[Example 1E] Preparation of the Soil Stabilizer Composition Including the Salt of Lysine and Citric Acid, Thickener and Stabilizer: A Mol Ratio of Lysine and Citric Acid was 1:5 and an Amount of the Solid Content of Lysine and Citric Acid was 50 wt %

The soil stabilizer composition was prepared in the same manner as used to prepare Example 1A, except that the mol ratio of lysine to citric acid was 1:5.

[Example 1F] Preparation of the Soil Stabilizer Composition Including the Salt of Lysine and Citric Acid, Thickener and Stabilizer: A Mol Ratio of Lysine and Citric Acid was 10:1 and an Amount of the Solid Content of Lysine and Citric Acid was 50 wt %

The soil stabilizer composition was prepared in the same manner as used to prepare Example 1A, except that the mol ratio of lysine to citric acid was 10:1.

[Example 1G] Preparation of the Soil Stabilizer Composition Including the Salt of Lysine and Citric Acid, Thickener and Stabilizer: A Mol Ratio of Lysine and Citric Acid was 1:10 and an Amount of the Solid Content of Lysine and Citric Acid was 50 wt %

The soil stabilizer composition was prepared in the same manner as used to prepare Example 1A, except that the mol ratio of lysine to citric acid was 1:10.

[Example 2] Dust Scattering Suppression Effect and Water Resistance Evaluation

The soil stabilizer compositions were prepared according to the methods described in Examples 1A to 1G.

The soil stabilizer composition (the mol ratio of lysine to citric acid is 1.5:1 and the amount of solid content of lysine to citric acid is 50 wt %) obtained in Example 1A was diluted with water in such a manner that the amount of solid content was 1 wt %, 2.5 wt %, 5 wt %, 7.5 wt %, and 10 wt % (Composition a-1, Composition a-2, Composition a-3, Composition a-4, and Composition a-5).

The soil stabilizer composition (the mol ratio of lysine to citric acid is 3:1 and the amount of solid content of lysine to citric acid is 50 wt %) obtained in Example 1B was diluted with water in such a manner that the amount of solid content was 1.5 wt %, 2 wt %, and 2.5 wt % (Composition a-6, Composition a-7, and Composition a-8).

The soil stabilizer composition (the mol ratio of lysine to citric acid is 1:3 and the amount of solid content of lysine to citric acid is 50 wt %) obtained in Example 1C was diluted with water in such a manner that the amount of solid content was 1.5 wt %, 2 wt %, and 2.5 wt % (Composition a-9, Composition a-10, and Composition a-11).

The soil stabilizer composition (the mol ratio of lysine to citric acid is 5:1 and the amount of solid content of lysine to citric acid is 50 wt %) obtained in Example 1D was diluted with water in such a manner that the amount of solid content was 1.5 wt %, 2 wt %, and 2.5 wt % (Composition a-12, Composition a-13, and Composition a-14).

The soil stabilizer composition (the mol ratio of lysine to citric acid is 1:5 and the amount of solid content of lysine to citric acid is 50 wt %) obtained in Example 1E was diluted with water in such a manner that the amount of solid content was 1.5 wt %, 2 wt %, and 2.5 wt % (Composition a-15, Composition a-16, and Composition a-17).

The soil stabilizer composition (the mol ratio of lysine to citric acid is 10:1 and the amount of solid content of lysine to citric acid is 50 wt %) obtained in Example 1F was diluted with water in such a manner that the amount of solid content was 2.5 wt % (Composition a-18).

The soil stabilizer composition (the mol ratio of lysine to citric acid is 1:10 and the amount of solid content of lysine to citric acid is 50 wt %) obtained in Example 1G was diluted with water in such a manner that the amount of solid content was 2.5 wt % (Composition a-19).

As control A, a commercially available soil stabilizer (DUS-CON, Presto Co., Ltd.) containing magnesium chloride ($MgCl_2$) was prepared. The soil stabilizer was diluted before use in such a way that the amount of solid content was 20 wt % according to the guidelines for the soil stabilizer.

As control B, a commercially available soil stabilizer (Dustdown, ecoclean) containing, as a major component, a polyvinyl acetate/polyethylene copolymer emulsion was prepared. The soil stabilizer was diluted before use in such a way that the amount of solid content was 2 wt % according to the guidelines for the soil stabilizer.

As control C, deionized water was used.

Regarding respective soil stabilizer compositions, dust suppression efficiency, water resistance, dust suppression efficiency before and after the water treatment, and coal dust scattering suppression efficiency were evaluated according to the following method, and results thereof are shown in Tables 1 to 3.

1) Sand Dust Suppression Efficiency

Diluted compositions (a-1 to a-19), controls A, B, and C were each applied on sand (average particle diameter of 142.3±76.2 μm, LS particle size analyzer, Beckman Coulter) in an applied amount of 0.38 L/m², and then, at room temperature, the sands were dried 3 days and exposed to the blowing having a wind speed of 1.5 m/s to 1.6 m/s for 2 minutes, and the weights of the sands before and after the exposure to the blowing were compared and the fugitive dust suppression ratio was evaluated according to Equation 1. The evaluation results are shown in Table 1 below. The evaluation temperature was 25° C.±1° C.

Sand dust suppression ratio (%)=100−[($W_0$−$W_1$)/$W_0$×100]   [Equation 1]

In Equation 1, $W_0$ is the sand weight before blowing, and $W_1$ is the sand weight after blowing for 2 minutes at a wind speed of 1.5 m/s to 1.6 m/s.

2) Water Resistance

The soil stabilizer compositions were prepared according to the methods described in Example 1A. The soil stabilizer composition obtained in Example 1A was diluted with water to control the amount of the solid content to be 1 wt %, 2.5 wt %, 5 wt %, and 10 wt % (Compositions a-1 to a-3, and a-5).

Controls A and B were the same compositions as described above.

After applying the soil stabilizer composition to the glass column filled with sand at a certain height, the water resistance was evaluated according to the height (depth) to which the diluent solution penetrated. Compositions with good water resistance have a small penetration height (depth), and compositions with poor water resistance, that is, compositions that dissolve well in water have a great penetration height (depth).

A transparent glass column (3.6 cm in diameter, 18 cm in height) was filled with 250 g of sand up to the height of 16 cm. 12.5 g of each of the soil stabilizer compositions (a-1 to a-3 and a-5), of which the amount of solid content was controlled, was applied on the upper portion of the sand pillar filled in the glass column. After 180 minutes, the penetration ratio was evaluated by Equation 2 by measuring the height (depth) of the compositions penetrated into the sand by gravity. The evaluation results are shown in Table 2 below. The evaluation temperature was 25° C.±1° C.

Percolation ratio (%)=[$H_1$/$H_0$×100]   [Equation 2]

In Equation 2, $H_0$ is the total height of the sand filled in the glass column and $H_1$ is the height of the sand penetrated by the soil stabilizer composition.

3) Dust Suppression Efficiency Before and after Water Treatment

Subsequently, regarding the sand in the glass column on which the water resistance evaluation was performed, the dust suppression efficiency was evaluated in the same manner as described above before and after percolation of 750 mm of water per unit area.

The difference in dust suppression efficiency before and after the water percolation was evaluated and results thereof are shown in Table 1 below.

4) Coal Dust Scattering Suppression Efficiency

A cone-shaped structure was prepared by stacking 50 g of powder of sub-bituminous coal having the calory of 5,000 kcal/kg-coal to 5,500 kcal/kg-coal (coal having the water content of 2 wt % after 24 hr of drying at a temperature of 60° C.) on a substrate. Subsequently, Compositions a-1 to a-19, control A, control B, and control C were each sprayed in an amount of 2 L/m² on the surface of the structure from a point spaced apart from the outmost contact point between the structure and the substrate by 10 cm, and then, dried at a temperature of 25° C.±1° C. for 48 hours. The dried structure was exposed to blowing at a wind speed of 4 m/s to 5 m/s for 2 minutes, and then the weights of the structures before and after the blowing were compared to evaluate the coal dust scattering suppression ratio according to Equation 3 below.

In the sub-bituminous coal, the particle size of 2800 μm or more was 17.3%, the particle size of 2000 μm to 2800 μm was 8.9%, 500 μm to 2000 μm was 36.4%, 150 μm to 500 μm was 24%, and 150 μm or less was 13.4%. The evaluation results are shown in Table 1 below.

Coal dust suppression ratio (%)=100−[($W_0$−$W_1$)/$W_0$×100]   [Equation 3]

In Equation 3, $W_0$ is the weight of the coal structure before blowing, and $W_1$ is the weight of the coal structure after blowing for 2 minutes at a wind speed of 4 m/s to 5 m/s.

TABLE 1

| Lysine:CA (mol ratio) | Amount of solid content [wt %] | Composition | Sand dust suppression ratio [%] | Coal dust suppression ratio [%] |
|---|---|---|---|---|
| 1.5:1 | 1 | a-1 | 99.8 | 93.7 |
|  | 2.5 | a-2 | 99.8 | 96.3 |
|  | 5 | a-3 | 99.8 | 99.2 |
|  | 7.5 | a-4 | 99.8 | 99.9 |
|  | 10 | a-5 | 99.9 | 99.9 |
| 3:1 | 1.5 | a-6 | 97.9 | 92.2 |
|  | 2 | a-7 | 98.6 | 92.4 |
|  | 2.5 | a-8 | 99.2 | 96.4 |
| 1:3 | 1.5 | a-9 | 98.9 | 93.8 |
|  | 2 | a-10 | 99.0 | 94.5 |
|  | 2.5 | a-11 | 99.0 | 92.9 |
| 5:1 | 1.5 | a-12 | 93.8 | 92.5 |
|  | 2 | a-13 | 94.3 | 93.5 |
|  | 2.5 | a-14 | 96.5 | 95.6 |
| 1:5 | 1.5 | a-15 | 96.0 | 93.4 |
|  | 2 | a-16 | 97.2 | 94.8 |
|  | 2.5 | a-17 | 97.8 | 95.1 |
| 1:10 | 2.5 | a-18 | 87.3 | 79.8 |
| 10:1 | 2.5 | a-19 | 85.8 | 80.2 |
|  | 20 | control A | 99.7 | 82.4 |
|  | 2 | control B | 86.2 | 92.1 |
|  |  | control C | 25.8 | 79.7 |

As shown in Table 1, the soil stabilizer compositions (a-1 to a-19) prepared according to Examples 1A to 1G had higher sand dust suppression ratios than control C, and had a sand dust suppression ratio which is similar to those of controls A and B.

The soil stabilizer compositions (a-1 to a-17) prepared according to Examples 1A to 1G had higher coal dust suppression ratios than controls A, B, and C, and the soil stabilizer compositions (a-18 to a-19) had a coal dust suppression ratio which is similar to that of control C.

TABLE 2

| Composition | Percolation ratio [%] |
|---|---|
| a-1 | 100 |
| a-2 | 81 |
| a-3 | 50 |
| a-5 | 44 |
| control A | 100 |

As shown in Table 2, the soil stabilizer compositions prepared according to Example 1A (a-1 to a-3 and a-5) showed a percolation ratio which is equal to or lower than that of control A, and ultimately, a water resistance which is equal to or greater than that of control A.

TABLE 3

| Composition | Sand dust suppression ratio before water permeation [%] | Sand dust suppression ratio after water permeation [%] | difference in sand dust suppression ratio before/after water percolation [%] |
|---|---|---|---|
| a-1 | 99.8 | 29.4 | 70.4 |
| a-2 | 99.8 | 30.2 | 70.0 |
| a-3 | 99.8 | 36.6 | 63.2 |
| a-5 | 99.9 | 46.3 | 53.6 |
| control A | 99.7 | 29.3 | 70.4 |

As shown in Table 3, the soil stabilizer compositions prepared according to Example 1A (a-1 to a-3 and a-5) showed a difference in the sand dust suppression ratio that is equal to or lower than that of control A. That is, the soil stabilizer compositions showed improved water resistance properties.

[Example 3A] Preparation of the Soil Stabilizer Composition Including the Salt of Lysine and Citric Acid: The Mol Ratio of Lysine to Citric Acid was 1.5:1

55.31 g of Distilled water (DIW) was added to 100 g of 54 wt % L-lysine free form aqueous solution and then, stirred at room temperature (25° C.) for 30 minutes while lysine was diluted. 47.31 g of citric acid (CA) was slowly added to the diluted lysine at room temperature (25° C.) while stirring for 1 hour. Then, the resultant was stirred at a temperature of 60° C. for 1 hour. Subsequently, after the reaction mixture reached room temperature (25° C.), the reaction was terminated to obtain 202.62 g of the soil stabilizer composition. The amount of the solid content of the soil stabilizer composition was about 50 parts by weight based on 100 parts by weight of the soil stabilizer composition, and the mixed mol ratio of lysine to citric acid was 1.5:1, and the solvent was deionized water.

[Example 3B] Preparation of the Soil Stabilizer Composition Including the Salt of Lysine and Citric Acid: The Mol Ratio of Lysine to Citric Acid was 3:1

The soil stabilizer composition was prepared in the same manner as used to prepare Example 3A, except that the mol ratio of lysine to citric acid was 3:1.

[Example 3C] Preparation of the Soil Stabilizer Composition Including the Salt of Lysine and Citric Acid: The Mol Ratio of Lysine to Citric Acid was 1:3

The soil stabilizer composition was prepared in the same manner as used to prepare Example 3A, except that the mol ratio of lysine to citric acid was 1:3.

[Example 3D] Preparation of the Soil Stabilizer Composition Including the Salt of Lysine and Citric Acid: The Mol Ratio of Lysine to Citric Acid was 5:1

The soil stabilizer composition was prepared in the same manner as used to prepare Example 3A, except that the mol ratio of lysine to citric acid was 5:1.

[Example 3E] Preparation of the Soil Stabilizer Composition Including the Salt of Lysine and Citric Acid: The Mol Ratio of Lysine to Citric Acid was 1:5

The soil stabilizer composition was prepared in the same manner as used to prepare Example 3A, except that the mol ratio of lysine to citric acid was 1:5.

[Example 3F] Preparation of the Soil Stabilizer Composition Including the Salt of Lysine and Citric Acid: The Mol Ratio of Lysine to Citric Acid was 10:1

The soil stabilizer composition was prepared in the same manner as used to prepare Example 3A, except that the mol ratio of lysine to citric acid was 10:1.

[Example 3G] Preparation of the Soil Stabilizer Composition Including the Salt of Lysine and Citric Acid: The Mol Ratio of Lysine to Citric Acid was 1:10

The soil stabilizer composition was prepared in the same manner as used to prepare Example 3A, except that the mol ratio of lysine to citric acid was 1:10.

[Example 4A] Preparation of the Soil Stabilizer Composition Including the Salt of Lysine and Citric Acid and Thickener: The Mol Ratio of Lysine to Citric Acid was 1.5:1

53.33 g of Distilled water (DIW) was added to 100 g of 54 wt % L-lysine free form aqueous solution and then, stirred at room temperature (25° C.) for 30 minutes while lysine was diluted. 47.31 g of citric acid (CA) and xanthan gum were slowly added to the diluted lysine at room temperature (25° C.) while stirring for 1 hour. Then, the resultant was stirred at a temperature of 60° C. for 1 hour. Subsequently, after the reaction mixture reached room temperature (25° C.), the reaction was terminated to obtain 202.62 g of the soil stabilizer composition. The amount of the solid content of the soil stabilizer composition was about 50 parts by weight based on 100 parts by weight of the soil stabilizer composition, and the mixed mol ratio of lysine to citric acid was 1.5:1, and the solvent was deionized water. The amount of xanthan gum was 0.977 wt %.

[Example 4B] Preparation of the Soil Stabilizer Composition Including the Salt of Lysine and Citric Acid: The Mol Ratio of Lysine to Citric Acid was 3:1

The soil stabilizer composition was prepared in the same manner as used to prepare Example 4A, except that the mol ratio of lysine to citric acid was 3:1.

[Example 4C] Preparation of the Soil Stabilizer Composition Including the Salt of Lysine and Citric Acid: The Mol Ratio of Lysine to Citric Acid was 1:3

The soil stabilizer composition was prepared in the same manner as used to prepare Example 4A, except that the mol ratio of lysine to citric acid was 1:3.

[Example 4D] Preparation of the Soil Stabilizer Composition Including the Salt of Lysine and Citric Acid: The Mol Ratio of Lysine to Citric Acid was 5:1

The soil stabilizer composition was prepared in the same manner as used to prepare Example 4A, except that the mol ratio of lysine to citric acid was 5:1.

[Example 4E] Preparation of the Soil Stabilizer Composition Including the Salt of Lysine and Citric Acid: The Mol Ratio of Lysine to Citric Acid was 1:5

The soil stabilizer composition was prepared in the same manner as used to prepare Example 4A, except that the mol ratio of lysine to citric acid was 1:5.

[Example 4F] Preparation of the Soil Stabilizer Composition Including the Salt of Lysine and Citric Acid: The Mol Ratio of Lysine to Citric Acid was 10:1

The soil stabilizer composition was prepared in the same manner as used to prepare Example 4A, except that the mol ratio of lysine to citric acid was 10:1.

[Example 4G] Preparation of the Soil Stabilizer Composition Including the Salt of Lysine and Citric Acid: The Mol Ratio of Lysine to Citric Acid was 1:10

The soil stabilizer composition was prepared in the same manner as used to prepare Example 4A, except that the mol ratio of lysine to citric acid was 1:10.

[Example 5] Analysis of Water-Holding Capacities, Hygroscopicity, and Soil Compressive Strength of Adhesive Composition According to Mixed Mol Ratio of Lysine to Citric Acid The soil stabilizer compositions were prepared according to the methods described in Examples 3A to 3G.

The soil stabilizer composition prepared according to Example 3A (mol ratio of lysine to citric acid was 1.5:1) was diluted in such a way that the amount of solid content was 5 wt %, 10 wt %, 20 wt %, 25 wt % 30 wt %, 40 wt %, and 50 wt %. (Composition b-1, Composition b-2, Composition b-3, Composition b-4, Composition b-5, Composition b-6, and Composition b-7).

The soil stabilizer composition prepared according to Example 3B (mol ratio of lysine to citric acid was 3:1) was diluted in such a way that the amount of solid content was 5 wt %, 10 wt %, 20 wt %, and 25 wt % (Composition b-8, Composition b-9, Composition b-10, and Composition b-11).

The soil stabilizer composition prepared according to Example 3C (mol ratio of lysine to citric acid was 1:3) was diluted in such a way that the amount of solid content was 5 wt %, 10 wt %, 20 wt %, and 25 wt % (Composition b-12, Composition b-13, Composition b-14, and Composition b-15).

The soil stabilizer composition prepared according to Example 3D (mol ratio of lysine to citric acid was 5:1) was diluted in such a way that the amount of solid content was 5 wt %, 10 wt %, 20 wt %, and 25 wt % (Composition b-16, Composition b-17, Composition b-18, and Composition b-19).

The soil stabilizer composition prepared according to Example 3E (mol ratio of lysine to citric acid was 1:5) was diluted in such a way that the amount of solid content was 5 wt %, 10 wt %, 20 wt %, and 25 wt % (Composition b-20, Composition b-21, Composition b-22, and Composition b-23).

The soil stabilizer composition prepared according to Example 3F (mol ratio of lysine to citric acid was 10:1) was diluted in such a way that the amount of solid content was 10 wt %, 20 wt %, and 25 wt % (Composition b-24, Composition b-25, and Composition b-26).

The soil stabilizer composition prepared according to Example 3G (mol ratio of lysine to citric acid was 1:10) was diluted in such a way that the amount of solid content was 10 wt %, 20 wt %, and 25 wt % (Composition b-27, Composition b-28, and Composition b-29).

The soil stabilizer compositions were prepared according to the methods described in Examples 4A to 4G.

The soil stabilizer composition prepared according to Example 4A (mol ratio of lysine to citric acid=1.5:1) was diluted in such a way that the amount of solid content was 5 wt %, 10 wt %, 20 wt %, 25 wt %, 30 wt %, 40 wt %, and 50 wt % (Composition c-1, Composition c-2, Composition c-3, Composition c-4, Composition c-5, Composition c-6, and Composition c-7).

The soil stabilizer composition prepared according to Example 4B (mol ratio of lysine to citric acid was 3:1) was diluted in such a way that the amount of solid content was 5 wt %, 10 wt %, 20 wt %, and 25 wt % (Composition c-8, Composition c-9, Composition c-10, and Composition c-11).

The soil stabilizer composition prepared according to Example 4C (mol ratio of lysine to citric acid was 1:3) was diluted in such a way that the amount of solid content was 5 wt %, 10 wt %, 20 wt %, and 25 wt % (Composition c-12, Composition c-13, Composition c-14, and Composition c-15).

The soil stabilizer composition prepared according to Example 4D (mol ratio of lysine to citric acid was 5:1) was diluted in such a way that the amount of solid content was 5 wt %, 10 wt %, 20 wt %, and 25 wt % (Composition c-16, Composition c-17, Composition c-18, and Composition c-19).

The soil stabilizer composition prepared according to Example 4E (mol ratio of lysine to citric acid was 1:5) was diluted in such a way that the amount of solid content was 5 wt %, 10 wt %, 20 wt %, and 25 wt % (Composition c-20, Composition c-21, Composition c-22, and Composition c-23).

The soil stabilizer composition prepared according to Example 4F (mol ratio of lysine to citric acid was 10:1) was diluted in such a way that the amount of solid content was 25 wt % and 50 wt % (Composition c-24 and Composition c-25).

The soil stabilizer composition prepared according to Example 4G (mol ratio of lysine to citric acid was 1:10) was diluted in such a way that the amount of solid content was 25 wt % and 50 wt % (Composition c-26 and Composition c-27).

As control D, a commercially available soil stabilizer (DUS-CON, Presto Co., Ltd) containing magnesium chloride ($MgCl_2$) was prepared. The soil stabilizer was diluted according to the guidelines therefor in such a manner that the amount of solid content of the soil stabilizer was 10 wt %, 20 wt %, and 25 wt % (Compositions D-1, D-2, and D-3).

As control E, a commercially available soil stabilizer (Dustdown, ecoclean) containing, as a major component, a polyvinyl acetate/polyethylene copolymer emulsion was prepared. The soil stabilizer was diluted according to the guidelines therefor in such a manner that the amount of solid content of the soil stabilizer was 10 wt %, 20 wt %, and 25 wt % (Compositions E-1, E-2, and E-3).

As control F, deionized water was used.

Regarding respective soil stabilizer compositions, the water-holding capacities in the soil, composition water-holding capacities, soil compressive strength, and hygroscopicity were evaluated according to the method described below, and results thereof are shown in Tables 4 to 7.

1) Efficiency of Water Holding Capacity in Soil

A mixed soil was placed in a plastic container with a width of 7.8 cm and a length of 7.8 cm and the soil stabilizer compositions of Examples 3A to 3G, Examples 4A to 4G, control D, control E, and control F were sprayed on the surface of mixed soil. The mixed soil was prepared by mixing sand, in which particles with an average particle diameter of 142.3 μm occupied 87.6% (d10 68.31 μm, d50 128.1 μm, d90 229.8 μm), and clay, in which particles with a particle diameter of 400 mesh or less occupied 12.4%, and adjusting the moisture content thereof to be 18.6%.

While the temperature and the relative humidity (RH) were respectively maintained at 25° C.±1° C. and 20%±5%, the change in the weight of the mixed soil for 24 hours was measured to calculate a moisture decrease ratio according to Equation 5 and thus evaluate a relative efficiency of water-holding capacity with respect to control F according to Equation 4. In Equation 4, moisture decrease ratio of the soil after spraying of water is obtained by using water instead of the composition in Equation 5. Some of the evaluation results are shown in Table 4 below.

The smaller moisture decrease ratio leads to a smaller loss of moisture compared to a mixed soil containing pure water (control F), and the higher relative water-holding property leads to a higher moisture holding ratio compared to a mixed soil containing pure water (control F).

Relative efficiency of water-holding capacity (%)= [1−(moisture decrease ratio of the soil after spraying of composition/moisture decrease ratio of the soil after spraying of water)]×100     [Equation 4]

Moisture decrease ratio of the soil after spraying of composition=[(weight of mixed soil immediately after spraying of composition−weight of the mixed soil after 24 hours)/weight of mixed soil immediately after spraying of composition]×100     [Equation 5]

2) Inherent Efficiency of Water Holding Capacity

The soil stabilizer compositions of Examples 3A to 3G, Examples 4A to 4G, control D, and control E, and control F were each added in an amount of 25 g into a plastic container having a width of 7.8 cm and a length of 7.8 cm.

Then, while the temperature and the relative humidity (RH) were respectively maintained at 40° C.±1° C. and 10%±5%, the change in the weight of the composition for 24 hours was measured to calculate a decrease ratio of moisture according to Equation 6 and thus evaluate a water-holding capacity. Some of the evaluation results are shown in Table 5 below.

The lower water-holding capacities of a composition, the greater loss of moisture.

Water-holding capacities of composition (%)= [(weight of loaded composition−decreased weight of composition after 24 hours)/weight of loaded composition]×100     [Equation 6]

3) Evaluation on Soil Compressive Strength 28 g of each of the soil stabilizer compositions of Examples 3A to 3G, Examples 4A to 4G, control D, and control F (water) were mixed with 100 g of the soil having the average particle diameter of 142.3 μm (d10 68.31 μm, d50 128.1 μm, and d90 229.8 μm), and then, cylindrical blocks were measured having a diameter of 3.5 cm-4.5 cm and a height of 5 cm were formed and dried in a drying device at a temperature of 60° C. for 72 hours, and then, a soil compressive strength of each of the dried cylindrical blocks by using Leader II compression tester of Gotech testing Machines Inc. (in the case of the soil compressive strength of 100 kgf or less), and LY8211 compression tester (in the case of the soil compressive strength of 100 kgf or more). Some of the measurement results are shown in Table 6 below.

4) Hygroscopicity Evaluation

A mixture of 20 g of each of the soil stabilizer compositions of Examples 3A to 3G, Examples 4A to 4G, control D, and control E and 20 g of sand was loaded in a plastic container having a width of 7.8 cm and a length of 7.8 cm, and dried at a temperature of 60° C.±1° C. for 3 hours.

Then, while the temperature and the relative humidity (RH) were respectively maintained at 25° C.±1° C. and 90%±5%, the change in the weight of the soil for 22 hours was measured to calculate an absorption of moisture according to Equation 7 and thus evaluate hygroscopicity. Some of the evaluation results are shown in Table 7 below.

The higher moisture absorption ratio of a soil stabilizer composition, the higher hygroscopicity thereof Moisture absorption ratio=[(weight of composition after 24 hours−weight of loaded composition)/ weight of loaded composition without sand]× 100     [Equation 7]

TABLE 4

| No. | Lysine:CA (mol ratio) | Amount of solid content (%) | Quantity for spray on surface (g/m²) | Relative efficiency of water-holding capacities (%) |
|---|---|---|---|---|
| b-1 | 1.5:1 | 5 | 40 | 34.4 |
| c-1 | 1.5:1 | 5 | 40 | 33.9 |
| b-2 | 1.5:1 | 10 | 40 | 42.2 |
| c-2 | 1.5:1 | 10 | 40 | 42.1 |
| b-8 | 3:1 | 5 | 40 | 89.4 |
| b-9 | 3:1 | 10 | 40 | 90.9 |
| b-12 | 1:3 | 5 | 40 | 88.5 |
| b-13 | 1:3 | 10 | 40 | 96.2 |
| b-16 | 5:1 | 5 | 40 | 103.8 |
| b-17 | 5:1 | 10 | 40 | 104.7 |
| b-20 | 1:5 | 5 | 40 | 66.3 |
| b-21 | 1:5 | 10 | 40 | 91.2 |
| control D (D-1) | — | 10 | 40 | −8.6 |
| control E (E-1) | — | 10 | 40 | −10.8 |
| control F | — | 0 | 40 | 0 |
| b-1 | 1.5:1 | 5 | 80 | 44.5 |
| c-1 | 1.5:1 | 5 | 80 | 42.1 |
| b-2 | 1.5:1 | 10 | 80 | 46.7 |
| c-2 | 1.5:1 | 10 | 80 | 50.5 |
| b-8 | 3:1 | 5 | 80 | 126.3 |
| b-9 | 3:1 | 10 | 80 | 95.4 |
| b-12 | 1:3 | 5 | 80 | 88.3 |
| b-13 | 1:3 | 10 | 80 | 100.9 |
| b-16 | 5:1 | 5 | 80 | 97.9 |
| b-17 | 5:1 | 10 | 80 | 104.2 |
| b-20 | 1:5 | 5 | 80 | 81.5 |
| b-21 | 1:5 | 10 | 80 | 82.5 |
| control D (D-1) | — | 10 | 80 | 6.8 |
| control E (E-1) | — | 10 | 80 | 11.0 |
| control F | — | 0 | 80 | 0 |
| b-1 | 1.5:1 | 5 | 160 | 52.0 |
| c-1 | 1.5:1 | 5 | 160 | 55.3 |
| b-2 | 1.5:1 | 10 | 160 | 52.3 |
| c-2 | 1.5:1 | 10 | 160 | 62.2 |
| b-8 | 3:1 | 5 | 160 | 93.4 |
| b-9 | 3:1 | 10 | 160 | 99.2 |
| b-12 | 1:3 | 5 | 160 | 89.2 |
| b-13 | 1:3 | 10 | 160 | 98.6 |
| b-16 | 5:1 | 5 | 160 | 109.0 |
| b-17 | 5:1 | 10 | 160 | 95.4 |
| b-20 | 1:5 | 5 | 160 | 63.3 |
| b-21 | 1:5 | 10 | 160 | 82.5 |
| control D (D-1) | — | 10 | 160 | −5.2 |
| control E (E-1) | — | 10 | 160 | −10.7 |
| control F | — | 0 | 160 | 0 |
| b-1 | 1.5:1 | 5 | 320 | 55.1 |
| c-1 | 1.5:1 | 5 | 320 | 57.0 |
| b-2 | 1.5:1 | 10 | 320 | 55.8 |
| c-2 | 1.5:1 | 10 | 320 | 63.9 |
| b-8 | 3:1 | 5 | 320 | 86.1 |
| b-9 | 3:1 | 10 | 320 | 87.2 |
| b-12 | 1:3 | 5 | 320 | 80.3 |
| b-13 | 1:3 | 10 | 320 | 87.3 |
| b-16 | 5:1 | 5 | 320 | 87.0 |
| b-17 | 5:1 | 10 | 320 | 84.6 |
| b-20 | 1:5 | 5 | 320 | 64.6 |
| b-21 | 1:5 | 10 | 320 | 49.0 |
| control D (D-1) | — | 10 | 320 | −6.8 |
| control E (E-1) | — | 10 | 320 | −11.7 |
| control F | — | 0 | 320 | 0 |
| b-1 | 1.5:1 | 5 | 640 | 62.9 |
| c-1 | 1.5:1 | 5 | 640 | 66.1 |
| b-2 | 1.5:1 | 10 | 640 | 64.3 |
| c-2 | 1.5:1 | 10 | 640 | 80.3 |
| b-8 | 3:1 | 5 | 640 | 75.9 |
| b-9 | 3:1 | 10 | 640 | 84.0 |
| b-12 | 1:3 | 5 | 640 | 64.8 |
| b-13 | 1:3 | 10 | 640 | 72.6 |
| b-16 | 5:1 | 5 | 640 | 82.9 |
| b-17 | 5:1 | 10 | 640 | 68.5 |
| b-20 | 1:5 | 5 | 640 | 64.2 |
| b-21 | 1:5 | 10 | 640 | 70.2 |
| b-24 | 10:1 | 10 | 640 | 0.4 |
| b-27 | 1:10 | 10 | 640 | 2.1 |
| control D (D-1) | — | 10 | 640 | −5.9 |
| control E (E-1) | — | 10 | 640 | −10.9 |
| control F | — | 0 | 640 | 0 |

Referring to Table 4, the soil stabilizer compositions prepared according to Examples 3A to 3G and Examples 4A to 4G had lower moisture decrease ratio in the soil than those of control D and control E and control F. That is, the soil stabilizer compositions showed improved relative efficiency of water-holding capacity in the soil.

TABLE 5

| No. | Lysine:CA (mol ratio) | Amount of solid content (%) | Water-holding capacities after 24 hours (%) |
|---|---|---|---|
| b-4 | 1.5:1 | 25 | 32.5 |
| c-4 | 1.5:1 | 25 | 35.7 |
| b-11 | 3:1 | 25 | 33.2 |
| c-11 | 3:1 | 25 | 39.3 |
| b-15 | 1:3 | 25 | 31.2 |
| c-15 | 1:3 | 25 | 37.5 |
| b-19 | 5:1 | 25 | 31.2 |
| c-19 | 5:1 | 25 | 40.2 |
| b-23 | 1:5 | 25 | 29.8 |
| c-23 | 1:5 | 25 | 35.3 |
| b-26 | 10:1 | 25 | 14.6 |
| c-24 | 10:1 | 25 | 18.7 |
| b-29 | 1:10 | 25 | 16.0 |
| c-26 | 1:10 | 25 | 28.3 |
| control D (D-3) | — | 25 | 67.9 |
| control E (E-3) | — | 25 | 10.1 |
| control F | — | 0 | 0 |

Referring to Table 5, the soil stabilizer compositions prepared according to Examples 3A to 3G and Examples 4A to 4G had a higher moisture decrease ratio therein than control D but a lower moisture decrease ratio therein than control E and control F. That is, as shown in Table 4 and Table 5, the soil stabilizer compositions provide excellent water-holding properties in the soil, and the soil stabilizer compositions themselves also showed good inherent efficiency of water holding capacity.

TABLE 6

| No. | Lysine:CA (mol ratio) | Amount of solid content (%) | Compressive strength after drying at a temperature of 60° C. (kgf) |
|---|---|---|---|
| b-2 | 1.5:1 | 10 | 34.5 |
| c-2 | 1.5:1 | 10 | 156.3 |

TABLE 6-continued

| No. | Lysine:CA (mol ratio) | Amount of solid content (%) | Compressive strength after drying at a temperature of 60° C. (kgf) |
|---|---|---|---|
| b-9 | 3:1 | 10 | 63.8 |
| b-13 | 1:3 | 10 | 15.8 |
| b-17 | 5:1 | 10 | 55.0 |
| b-21 | 1:5 | 10 | 18.7 |
| b-24 | 10:1 | 10 | 11.8 |
| b-27 | 1:10 | 10 | 13.2 |
| control F | — | 0 | 16.9 |
| control D-1 | — | 10 | 7.9 |
| b-3 | 1.5:1 | 20 | 40.9 |
| c-3 | 1.5:1 | 20 | 359.4 |
| b-10 | 3:1 | 20 | 89.8 |
| b-14 | 1:3 | 20 | 21.1 |
| b-18 | 5:1 | 20 | 91.8 |
| b-22 | 1:5 | 20 | 24.8 |
| b-25 | 10:1 | 20 | 11.5 |
| b-28 | 1:10 | 20 | 14.2 |
| control D-2 | — | 20 | 10.1 |
| b-5 | 1.5:1 | 30 | 347.5 |
| c-5 | 1.5:1 | 30 | 714.9 |
| b-6 | 1.5:1 | 40 | 857.9 |
| c-6 | 1.5:1 | 40 | 1142.1 |
| b-7 | 1.5:1 | 50 | 1351.9 |
| c-7 | 1.5:1 | 50 | 1492.6 |

Referring to Table 6, the soil stabilizer compositions prepared according to Examples 3A to 3G and Examples 4A to 4G showed increased soil compressive strength in the soil compared to control D and control F. Therefore, the soil stabilizer compositions prepared according to Examples 3A to 3G and Examples 4A to 4G may effectively prevent the decomposition of the soil.

TABLE 7

| No. | Lysine:CA (mol ratio) | Amount of solid content (%) | Moisture absorption ratio (%) |
|---|---|---|---|
| b-2 | 1.5:1 | 10 | 6.6 |
| b-9 | 3:1 | 10 | 10.0 |
| b-13 | 1:3 | 10 | 7.3 |
| b-17 | 5:1 | 10 | 10.9 |
| b-21 | 1:5 | 10 | 8.0 |
| b-24 | 10:1 | 10 | 12.0 |
| b-27 | 1:10 | 10 | 8.3 |
| control D-1 | — | 10 | 32.6 |
| control E-1 | — | 10 | 0.1 |
| control F | — | 0 | 0.0 |
| b-4 | 1.5:1 | 25 | 5.9 |
| c-4 | 1.5:1 | 25 | 7.9 |
| b-11 | 3:1 | 25 | 15.5 |
| b-15 | 1:3 | 25 | 6.4 |
| b-19 | 5:1 | 25 | 16.2 |
| b-23 | 1:5 | 25 | 9.4 |
| b-26 | 10:1 | 25 | 17.4 |
| b-29 | 1:10 | 25 | 12.4 |
| control D (D-3) | — | 25 | 68.3 |
| control E (E-3) | — | 25 | 0.1 |
| control F | — | 0 | 0.0 |

Referring to Table 7, the soil stabilizer compositions prepared Examples 3A to 3G and Examples 4A to 4G showed increased moisture absorption ratio compared to control E and control F. That is, the soil stabilizer compositions prepared according to Examples 3A to 3G and Examples 4A to 4G showed improved hygroscopicity and may prevent drying of the soil.

Control D is an inorganic salt soil stabilizer, and accordingly, provided a high moisture absorption ratio compared to the soil stabilizer compositions prepared according to Example 3A to 3G.

However, control D, as shown in Table 1, Table 2, Table 4, and Table 6, showed a low dust suppression ratio, poor water-holding capacities in the soil, poor composition water-holding capacities, and low soil compressive strength, compared to the soil stabilizer compositions prepared according to Examples 3A to 3G.

In addition, control D, which is the inorganic salt soil stabilizer, as described in the prior art section, is dissolved by rain, easily removed from the surface horizon, introduced into the river, etc., which has a negative effect on the salt concentration on the water ecosystem such as the river, and corrodes roads, steel structures, etc. existing on the soil surface to deteriorate the durability thereof. The use of excess inorganic salt soil stabilizer causes environmental problems such as soil acidification, plant death, or the like.

[Reference Example 1] Evaluation of Stability of Composition Containing Lysine and Organic Acids (Composition Including Lysine and Citric Acid at a Mol Ratio of 1:1)

79 g of Distilled water (DIW) was added to 100 g of 54 wt % L-lysine free form aqueous solution and then, stirred at room temperature (25° C.) for 30 minutes while lysine was diluted. 70.97 g of citric acid (CA) was slowly added to the diluted lysine at room temperature (25° C.) while stirring for 1 hour. Then, the resultant was stirred at a temperature of 60° C. for 1 hour. Subsequently, after the reaction mixture reached room temperature (25° C.), the reaction was terminated to obtain 249.93 g of adhesive composition. The amount of the solid content of the soil stabilizer composition was about 50 parts by weight based on 100 parts by weight of the soil stabilizer composition, and the mixed mol ratio of lysine to citric acid was 1:1, and the solvent was deionized water.

(Composition Including Lysine and Other Organic Acid at a Mol Ratio of 1:1)

A composition was prepared in the same manner as the above method, except that only a different type of organic acid was used.

A composition was prepared in the same manner as in Example 1, except that, instead of citric acid, each of acetic acid, glutamic acid, glutaric acid, tartaric acid, aspartic acid, fumaric acid, glyoxylic acid, 4-ketoprimelic acid, pyruvic acid, 1,3-acetone dicarboxylic acid was used.

(Precipitation Evaluation)

The precipitation of the prepared compositions was evaluated. Specifically, each composition was applied to a thickness of about 50 μm on a 50 μm thick OPP film (Samyoung Chemical Co., Ltd.) by using a bar coater. The film with the composition thereon was left at room temperature (25° C.) and at a relative humidity 60±10% for 14 days, and then, a change in the surface of the OPP film on which the adhesive composition was applied was identified and the shape change was evaluated.

Compositions containing lysine and citric acid did not form precipitates, whereas compositions containing other organic acids and lysine formed precipitates and could not evaluate the adhesion properties thereof.

When a composition was prepared by mixing lysine and various organic acids, it was confirmed that not all compositions are a composition that does not form precipitates and show the adhesion property.

[Reference Example 2] Solubility Evaluation According to the Solvent of the Composition According to the preparation method described in Reference Example 1, an adhesive composition containing lysine and citric acid was prepared. 25 g of each of the additional solvents described below was added to 50 g of the prepared adhesive composition (mol ratio of lysine to citric acid was 1:1, and an amount of solid content was 50 parts by weight), and then, stirred for 1 hour. After the stirring, the solubility of the adhesive composition with respective to methanol, toluene, benzene, chloroform, methylene chloride, dichloromethane, tetrahydrofuran (THF), ethyl acetate, dimethylformamide (DMF), dimethylsulfoxide (DMSO), and n-hexane solvent, which are the additional solvents of the adhesive composition, was evaluated. Evaluation results show that when methanol, which is an alcohol, was used as the additional solvent in the adhesive composition prepared according to Example 1, the adhesive composition was dissolved, whereas in the case of other additional organic solvents, the adhesive composition did not dissolve and formed precipitates.

[Reference Example 3] Analysis of Shape, Viscosity and Initial Tack of Adhesive Composition According to Amount of Solid Content According to the preparation method described in Reference Example 1, an adhesive composition containing lysine and citric acid was prepared. However, the amount of solid content in the adhesive composition was controlled to be 10 wt %, 20 wt %, 30 wt %, 40 wt %, 50 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, and 75 wt %. (The mol ratio of lysine to citric acid was 1:1) (Compositions 1-1 to 1-19) The amount of solid content was controlled depending on the amount of water.

1) Stability Evaluation

Detailed methods for evaluating the stability of respective adhesive compositions having various molar ratios are as follows. Respective adhesive compositions were quantified in an amount of 1 g on an aluminum dish having a diameter of 5 cm. Afterwards, the formation of precipitates in the adhesive compositions was observed for 14 days at room temperature (25° C.) and at a relative humidity 60±10%.

2) Viscosity Evaluation

Viscosity was measured by using a rotary viscometer (manufacturer: AMYRHEOLOGY, product name: RM200 TOUCH CP400 or RM200 TOUCH) at a temperature of 25±1° C., at LV-1 spindle, and at 60 rpm.

3) Initial Tack Evaluation

In the stability evaluation, the initial tack was evaluated on the compositions which had not formed precipitates. The initial tack was evaluated by using Anton Paar Co., Ltd Rheometer measuring equipment, by which the initial adhesive strengths of the adhesive compositions were compared. A probe formed of SUS material and having a diameter of 25 mm was brought into contact with the adhesive composition for 1 minute and 0.01 mm gap was maintained, and then the probe was peeled at a constant speed. The force required for separating the probe was measured to quantitatively evaluate an instantaneous initial adhesiveness.

The evaluation results are shown in Table 8 below.

TABLE 8

| No. | lysine:CA (mol ratio) | Amount of solid content (wt %) | Viscosity (mPa · s) | Initial tack (mJ) | Formation of precipitates |
|---|---|---|---|---|---|
| 1-1 | 1:1 | 10 | 10.08 | 0.21 | None |
| 1-2 | 1:1 | 20 | 11.84 | 0.217 | None |
| 1-3 | 1:1 | 30 | 13.54 | 0.216 | None |
| 1-4 | 1:1 | 40 | 16.24 | 0.22 | None |
| 1-5 | 1:1 | 50 | 26.68 | 0.222 | None |
| 1-6 | 1:1 | 60 | 85.28 | 0.523 | None |
| 1-7 | 1:1 | 61 | 91.45 | 0.562 | None |
| 1-8 | 1:1 | 62 | 99.13 | 0.614 | None |
| 1-9 | 1:1 | 63 | 115.22 | 0.652 | None |
| 1-10 | 1:1 | 64 | 125.35 | 0.751 | None |
| 1-11 | 1:1 | 65 | 168.5 | 0.783 | None |
| 1-12 | 1:1 | 66 | 184.15 | 0.899 | None |
| 1-13 | 1:1 | 67 | 233.56 | 0.921 | None |
| 1-14 | 1:1 | 68 | 290.52 | 1.12 | None |
| 1-15 | 1:1 | 69 | 424.2 | 1.24 | None |
| 1-16 | 1:1 | 70 | 657.67 | 1.48 | None |
| 1-17 | 1:1 | 71 | Insoluble material (CA) is present | | |
| 1-18 | 1:1 | 72 | Insoluble material (CA) is present | | |
| 1-19 | 1:1 | 75 | Insoluble material (CA) is present | | |

Referring to Table 8, it was confirmed that when the amount of solid content in a composition was 71 wt % or more, precipitates were formed, whereas when the amount of solid content in a composition was from 10 wt % to 70 wt %, precipitates were not formed and the composition maintained its liquid state.

[Reference Example 4] Comparison Regarding Initial Tack

The adhesive forces of a conventional adhesive and an adhesive composition according to the present disclosure were compared.

According to the preparation method described in Reference Example 1, an adhesive composition containing lysine and citric acid was prepared. However, the amount of water was controlled in such a manner that the amount of the solid content in the adhesive composition was 10 wt %. (Mol ratio of lysine to citric acid was 1:1)(Composition 2-1)

Commercially available polyvinyl alcohol based adhesive (PVA 088-50, Qingdao Sanhuan Colorchem CO., Ltd) was prepared, and then, the amount of water was controlled in such a way that the amount of solid content was 10 wt % to prepare an adhesive composition (hereinafter refer to as control 1).

Using the same method as described in connection with Reference Example 3, the viscosity and initial tack of the adhesive composition (amount of solid content of 10 wt %) of the present application and control 1 were evaluated. The evaluation results are shown in Table 9 below.

TABLE 9

| No. | Amount of solid content (wt %) | Viscosity (mPa · s) | Initial adhesive force (mJ) |
|---|---|---|---|
| 2-1 | 10 | 10.1 | 0.21 |
| control 1 (PVA based) | 10 | 43.49 | 0.201 |

Referring to Table 9, the adhesive composition according to the present application showed the same level of initial adhesive force as compared to the polyvinyl alcohol-based adhesive composition (control 1).

[Reference Example 5] Evaluation of Peel Strength According to Solvent

According to the preparation method described in Reference Example 1, an adhesive composition containing lysine and citric acid was prepared (the followings 3-1 to 3-3). However, the molar ratio of lysine and citric acid was 1.5:1, 1:1, and 1:1.5 to prepare adhesive compositions. (the amount of solid content of 50 parts by weight)

According to the preparation method described in Reference Example 1, an adhesive composition containing lysine and citric acid was prepared (the followings 3-4 to 3-6). However, the molar ratio of lysine and citric acid was 1.5:1, 1:1, and 1:1.5 to prepare adhesive compositions, and methanol was additionally used as a solvent. The weight ratio of the deionized water and methanol was 1:1. (the amount of solid content of 50 parts by weight)

According to the preparation method described in Reference Example 1, an adhesive composition containing lysine and citric acid was prepared (the followings 3-7 to 3-8). However, methanol other than deionized water was added, and the weight ratio of deionized water to methanol was set to 6:4, and 4:6. (mol ratio of lysine and citric acid was 1:1, amount of solid content was 50 parts by weight)

As a control, a commercially available acrylic adhesive (K901, Hansung P & I) (hereinafter referred to as control 2) (amount of solid content of 59 wt %) was prepared. Peel strength of each of the adhesive compositions was evaluated according to the following method, and evaluation results are shown in Table 10 below.

1) Pee Strength

After a PET film was prepared, (film size: 120 mm*25 mm, and thickness: 38 μm or 50 μm) a sample was coated on the surface of the PET film (50 μm thickness) to a thickness of 11 μm by using a bar coater. After drying in an oven at a temperature of 60° C. for 4 minutes, lamination was carried out with a PET film (38 μm thick) using a dry laminator device (roller speed 1.9 m/min, roller temp. 60° C.). The laminated specimen was dried for 72 hr in an oven controlled at a temperature of 30° C. The peel strength of the dried specimen was measured according to an ASTM D1876 "180° T Peel strength measurement" method. The evaluation results are shown in Table 10 below.

TABLE 10

| No. | lysine:CA (mol ratio) | Solvent | Amount of solid content (wt %) | Peel strength (N/25 mm) |
|---|---|---|---|---|
| 3-1 | 1.5:1 | DIW | 50 | 5.91 |
| 3-2 | 1:1 | | | 5.45 |
| 3-3 | 1:1.5 | | | 4.92 |
| 3-4 | 1.5:1 | DIW and Methanol (1:1 wt ratio) | | 7.11 |
| 3-5 | 1:1 | | | 6.92 |
| 3-6 | 1:1.5 | | | 6.18 |
| 3-7 | 1:1 | DIW and Methanol (6:4 wt ratio) | | 6.28 |
| 3-8 | 1:1 | DIW and Methanol (4:6 wt ratio) | | — |
| control 2 (Acryl based) | — | | 59 | 6.61 |

Referring to Table 10, the PET film adhered onto a stainless steel by using the adhesive composition according to the present application was separated within 1 hour, and a similar peel strength was provided even with a lower amount of solid content compared to control 2.

In addition, the peel strength was improved when water and alcohol were used as solvents. The increased peel strength is because the adhesive composition using the mixed solvent has a lower contact angle than the adhesive composition containing only deionized water and, as a result, has a better coating property on the substrate. However, when deionized water and alcohol had the weight ratio of 4:6, phase separation occurred in the adhesive composition, and thus the prepared adhesive composition was not available.

[Reference Example 6] Analysis of Composition in Adhesive Composition According to Reaction Temperature In preparing the adhesive composition, the composition of the adhesive composition was analyzed according to temperature conditions.

1) Preparation at a temperature of 0° C. (low temperature): 79 g of Distilled water (DIW) was added to 100 g of 54 wt % lysine aqueous solution and stirred at a temperature of 0° C. (T1) for 30 minutes. 70.97 g of citric acid was slowly added to the diluted product at a temperature of 0° C. (T2) and stirred for 1.5 hours to prepare an adhesive composition. (amount of solid content: 50 wt %, mixed molar ratio of lysine and citric acid=1:1) An ice bath was used to maintain the same temperature while stirring.

2) Preparation at a temperature of 25° C. (room temperature): 79 g of Distilled water (DIW) was added to 100 g of 54 wt % lysine aqueous solution and stirred at room temperature of 25° C. (T1) for 30 minutes. The diluted resultant was stirred while slowly adding 70.97 g of CA at a temperature of 25° C. (T2) for 1.5 hours to prepare an adhesive composition. (Amount of solid content: 50 wt %, and the mixed molar ratio of lysine to citric acid ratio=1:1). A temperature controller was used to maintain the same temperature while the adhesive composition was stirred (hereinafter identical).

3) Preparation at 60° C.: A composition was prepared in the same manner as in 2), except that T2 was changed to 60° C.

4) Preparation at 80° C.: A composition was prepared in the same manner as in 2), except that T2 was changed to 80° C.

5) Preparation at 240° C.: A composition was prepared in the same manner as in 2), except that T2 was changed to 240° C.

As a result of preparing the composition according to the above method, carbides were formed at a temperature of 240° C., thus making it impossible to prepare an adhesive composition. Therefore, component analysis was performed on the compositions prepared at a temperature of each of 0° C., 25° C., 60° C., and 80° C. by using $^1$H NMR.

The NMR analyzer and conditions used in the present application are as follows.

$^1$H NMR analysis was performed on the prepared compositions by using a superconducting Fourier transform nuclear magnetic resonance spectrometer (400 MHz) model name: AVANCE II 400, manufacturer: Bruker Biospin (Magnet field strength 9.4 Tesla, Field drift rate: 4 Hz/hr, Observable Frequency: 400 Mhz 1H, Sensitivity: 220:1 (1H), Variable Temp.: −70 to +110° C.), solvent: D2O 0° C. (sample 1), 25° C. (sample 2), and 80° C. (sample 3).

NMR analysis results are shown in FIG. 1. Referring to FIG. 1, the compositions prepared at temperatures of 0° C., 25° C., and 80° C. all showed $^1$H NMR peaks at the same positions, and chemical shifts did not occur, and thus, it is seen that all of the compositions have the same composition. In other words, in the adhesive compositions prepared at temperatures of 0° C., 25° C., and 80° C., lysine and citric acid are present in the form of a mixture, and there are no condensates of lysine and citric acid, or even when the condensate is formed, the amount thereof would be very small.

INDUSTRIAL APPLICABILITY

The method of suppressing dust generation according to one embodiment provides excellent dust suppression capability by using a novel soil stabilizer composition.

The soil stabilizer composition according to another embodiment provides excellent dust suppression capability and hygroscopicity at the same time by having a novel composition containing an aqueous low molecular weight material as a main component. It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method of suppressing dust generation, the method comprising:
preparing a soil stabilizer composition comprising a salt of lysine and citric acid, a solvent, and at least one of a thickener, a stabilizer, or a tackifier, wherein the salt of lysine and citric acid does not form a precipitate, and a mixed mol ratio of lysine and citric acid is from 1.5:1 to 1:3; and
spraying the soil stabilizer composition on soil.

2. The method of claim 1, which further comprises controlling an amount of solid content in the soil stabilizer composition, based on 100 parts by weight of the soil stabilizer composition, from about 0.1 parts by weight to about 70 parts by weight.

3. The method of claim 1, wherein the spraying of the soil stabilizer composition on soil is from 0.1 L/m$^2$ to 5 L/m$^2$.

4. The method of claim 1, wherein the preparing of the soil stabilizer composition comprises
preparing a mixture by mixing the lysine, the citric acid, the solvent, and at least one of a thickener, a stabilizer, or a tackifier; and
stirring the mixture at a temperature of 80° C. or less.

5. A soil stabilizer composition comprising a salt of lysine and citric acid, a solvent, and at least one of a thickener, a stabilizer, or a tackifier, wherein the salt of lysine and citric acid does not form a precipitate, and a mixed mol ratio of lysine and citric acid is from 1.5:1 to 1:3.

6. The soil stabilizer composition of claim 5, wherein the solvent is an aqueous solvent, and the aqueous solvent optionally comprises alcohol.

7. The soil stabilizer composition of claim 5, wherein an amount of a solid content in the soil stabilizer composition is, based on 100 parts by weight of the soil stabilizer composition, from about 0.1 parts by weight to about 70 parts by weight.

8. The soil stabilizer composition of claim 2, wherein the viscosity of the soil stabilizer composition is from about 1.0 mPa·s to about 50000 mPa·s at a temperature of 25° C.

9. The soil stabilizer composition of claim 5, wherein an initial tack of the soil stabilizer composition is from about 0.1 mJ to about 20 mJ at a temperature of 25° C.

10. The soil stabilizer composition of claim 5, wherein a relative efficiency of water-holding capacity represented by Equation 4 of the soil stabilizer composition is about 1% to about 300%:

relative efficiency of water-holding capacity (%)=[1−(moisture decrease ratio of the soil after spraying of composition/moisture decrease ratio of the soil after spraying of water)]×100, [Equation 4]

wherein the moisture decrease ratio of the soil after spraying of composition is defined by Equation 5:

moisture decrease ratio of the soil after spraying of composition=[(weight of mixed soil immediately after spraying of composition−weight of the sprayed, mixed soil after 24 hours at a temperature of 25° C.±1° C. and a relative humidity of 20%±5%)/weight of mixed soil immediately after spraying of composition]×100 [Equation 5]

and the moisture decrease ratio of the soil after spraying of water is defined by the following equation:

moisture decrease ratio of the soil after spraying of water=[(weight of mixed soil immediately after spraying of water−weight of the sprayed mixed soil after 24 hours at a temperature of 25° C.±1° C. and a relative humidity of 20%±5%)/weight of mixed soil immediately after spraying of water]×100.

11. The soil stabilizer composition of claim 5, wherein, based on 100 parts by weight of the soil stabilizer composition, an amount of solid content of the salt of lysine and citric acid is 0.1 parts by weight or more.

12. A spraying device comprising the soil stabilizer composition of claim 5.

* * * * *